United States Patent [19]
Hawkes et al.

[11] Patent Number: 5,973,643
[45] Date of Patent: Oct. 26, 1999

[54] METHOD AND APPARATUS FOR MOBILE EMITTER LOCATION

[75] Inventors: Kelly Davidson Hawkes, Los Altos; Jeffrey Lynn Koehler, San Jose, both of Calif.

[73] Assignee: Corsair Communications, Inc., Palo Alto, Calif.

[21] Appl. No.: 08/838,918

[22] Filed: Apr. 11, 1997

[51] Int. Cl.⁶ .................................................. G01S 3/02
[52] U.S. Cl. .......................................... 342/457; 455/456
[58] Field of Search .................................. 342/457, 463, 342/465; 455/456

[56] References Cited

U.S. PATENT DOCUMENTS

| | | |
|---|---|---|
| 3,663,762 | 5/1972 | Joel, Jr. ................................... 455/440 |
| 3,680,121 | 7/1972 | Anderson et al. . |
| 4,297,701 | 10/1981 | Henriques . |
| 4,433,335 | 2/1984 | Wind . |
| 4,596,988 | 6/1986 | Wanka . |
| 4,604,717 | 8/1986 | Kaplan . |
| 4,636,795 | 1/1987 | Dano . |
| 4,638,321 | 1/1987 | Drogin . |
| 4,639,733 | 1/1987 | King et al. . |
| 4,651,156 | 3/1987 | Martinez . |
| 4,651,157 | 3/1987 | Gray et al. . |
| 4,728,959 | 3/1988 | Maloney et al. . |
| 4,736,460 | 4/1988 | Rilling . |
| 4,740,792 | 4/1988 | Sagey et al. . |
| 4,742,357 | 5/1988 | Rackley . |
| 4,752,969 | 6/1988 | Rilling . |
| 4,797,679 | 1/1989 | Cusdin et al. . |
| 4,797,950 | 1/1989 | Rilling . |
| 4,870,422 | 9/1989 | Counselman, III . |
| 4,888,593 | 12/1989 | Friedman et al. . |

(List continued on next page.)

OTHER PUBLICATIONS

Kuykendall et al., "Cellular/PCS Systems Get In SYNC With GPS," *Wireless Systems Design*, 2 pgs., Feb. 1998.

Zablotney et al., "An Accurate Search and Rescue Location System," *Proceedings of the 47th Annual meeting on Navigation and Exploration*, 459–467, Jun. 1991.

"New Processing Techniques Based on the Constant Modulus Adaptive Algorithm," John R. Treichler and Michael G. Larimore, *IEEE Transactions on Acoustics, Speech and Signal Processing*, vol. ASSP–33, No. 2, pp. 420–431, Apr. 1985.

"A New Approach to Multipath Correction of Constant Modulus Signals," John R. Treichler and Brian G. Agee, *IEEE Transactions on Acoustics, Speech and Signal Processing*, vol. ASSP–31, pp. 459–472, Apr. 1983.

"Am Implementation of a CMA Adaptive Array for High Speed GMSK Transmission in Mobile Communications," Takeo Ohgane, Takanori Shimura, Naoto Matsuzawa and Hideichi Sasaoka, *IEEE Transactions on Vehicular Technology*, vol. 42, No. 3, pp. 282–288, Aug. 1993.

"The Complex LMS Algorithm," Bernard Widrow, John McCool and Michael Ball, *Proceedings Letters*, vol. 63, pp. 719–720, Apr. 975.

"Multiple Emitter Location and Signal Parameter Estimation," Ralph Schmidt, *IEEE Transactions on Antennas and Propagation*, vol. AP–34, No. 3, pp. 276–280, Mar. 1986.

*Primary Examiner*—Gregory C. Issing
*Attorney, Agent, or Firm*—Fish & Richardson PC

[57] ABSTRACT

A location system for identifying locations of emitters in a cellular telephone service area. Searching identifies active emitters in the service area to find the coarse areas in which active emitters are located, using selection criteria to designate one or more of the active emitters as selected emitters. Emitter signals are measured with a plurality of sensors, each sensor at a different location. Groups of the sensors are tasked, one group of tasked sensors for each corresponding selected emitter. Each tasked sensor takes a measurement on an emitter signal transmitted by the corresponding selected emitter. The measurements are processed to determine the location of each selected emitter based on the measurements from the group of tasked sensors.

36 Claims, 8 Drawing Sheets

U.S. PATENT DOCUMENTS

| | | |
|---|---|---|
| 4,891,650 | 1/1990 | Sheffer . |
| 4,975,741 | 12/1990 | Baghdady . |
| 5,008,679 | 4/1991 | Effland et al. . |
| 5,126,748 | 6/1992 | Ames et al. . |
| 5,153,902 | 10/1992 | Buhl et al. . |
| 5,166,694 | 11/1992 | Russell et al. . |
| 5,208,756 | 5/1993 | Song . |
| 5,293,642 | 3/1994 | Lo . |
| 5,317,323 | 5/1994 | Kennedy et al. . |
| 5,327,144 | 7/1994 | Stilp et al. . |
| 5,365,516 | 11/1994 | Jandrell . |
| 5,388,147 | 2/1995 | Grimes . |
| 5,390,339 | 2/1995 | Bruckert et al. . |
| 5,398,190 | 3/1995 | Wortham . |
| 5,404,376 | 4/1995 | Dent . |
| 5,428,546 | 6/1995 | Shah et al. . |
| 5,469,409 | 11/1995 | Anderson et al. . |
| 5,479,482 | 12/1995 | Grimes . |
| 5,485,163 | 1/1996 | Singer et al. . |
| 5,506,864 | 4/1996 | Schilling . |
| 5,512,908 | 4/1996 | Herrick . |
| 5,515,419 | 5/1996 | Sheffer . |
| 5,519,621 | 5/1996 | Wortham . |
| 5,519,760 | 5/1996 | Borkowski et al. . |
| 5,534,876 | 7/1996 | Erickson et al. . |
| 5,548,816 | 8/1996 | De Vaney . |
| 5,555,286 | 9/1996 | Tendler . |
| 5,570,412 | 10/1996 | LeBlanc . |
| 5,583,517 | 12/1996 | Yokev et al. . |
| 5,592,180 | 1/1997 | Yokev et al. . |
| 5,600,706 | 2/1997 | Dunn et al. . |
| 5,608,410 | 3/1997 | Stilp et al. . |
| 5,719,584 | 2/1998 | Otto ......................................... 342/457 |
| 5,736,964 | 4/1998 | Ghosh et al. ........................... 342/457 |
| 5,809,424 | 9/1998 | Eizenhoefer ............................ 455/456 |

METHOD AND APPARATUS FOR MOBILE EMITTER LOCATION

BACKGROUND OF THE INVENTION

The present invention relates to systems and methods for locating emitters in a prescribed geographic area and more particularly to locating mobile cellular telephones operating within a service area.

In cellular telephone systems, cellular base stations are deployed throughout the region (service area) where service is provided to cellular telephones. A cellular telephone communicates with one or more base stations. The cellular telephone infrastructure coordinates the transmissions of the mobile cellular telephones. Cellular base stations send commands to the cellular telephones directing them to transmit at certain times and at certain frequencies. When a base station initiates communication with a cellular telephone, it sends the cellular telephone a mobile station control message with a page order on its forward control channel. The cellular telephone sends a page response message on the reverse control channel. After a call is setup and the cellular telephone and the cellular base station are communicating on the reverse and forward voice channels respectively, the cellular base station may send a mobile station control message to the telephone on the forward voice channel to order the telephone to a new frequency, change its power, or command it to respond to verify it is still communicating. The cellular telephone acknowledges receipt of the message by returning an order confirmation to the cellular base station on the reverse voice channel. For the AMPS protocol, an order confirmation message is a digital signal that FSK modulates an RF carrier for 54.4 ms and produces a 30-kHz bandwidth RF signal. There is an existing protocol to communicate with the cellular telephone and this protocol is used to make the cellular telephone perform prescribed actions and respond with deterministic digital messages.

Typical base stations use six directional receive antennas, three pairs of diversity antennas each pair pointing in one of three different directions or sectors. The use of diversity along with directional antennas improves the received signal-to-noise ratio (SNR) by approximately 8 dB.

Call authorization and interfacing to the public switched telephone network is performed by the mobile switching center. When a mobile cellular telephone moves about in the service area, the call is handed off to other base stations as coordinated by the mobile switching center.

Prior art location systems deployed expensive hardware to locate each cellular telephone operating in the service area. They used wideband, high-dynamic range receivers with sub-band tuners to isolate each reverse control channel. There are 21 reverse control channels. Since the cellular telephone's transmission must be received at multiple cell sites, all 21 reverse control channels must be monitored and measured continuously by the equipment at the cell sites. To capitalize on the improvement provided by diversity and sectorized antennas, prior art systems must continuously monitor the 21 reverse control channels from six receive antennas; and consequently require a considerable number of receivers to intercept the transmissions from cellular telephones. Prior art systems have located all cellular telephones in an area and placed their locations in a database. Location applications then query the database to retrieve the location of a particular cellular telephone.

Prior art location systems forwarded to a central processor a representation of the 21 reverse control channels using a 1.536 Mbps T1 channel. A T1 channel is capable of carrying 24 voice grade channels. One encoding technique used a quantization of 1 bit per sample. To take advantage of the sectorized and diversity receivers, or to reduce the quantization noise by increasing the number of bits per sample, additional T1's are required which has the drawback of additional operating cost.

A further disadvantage of the prior art is that geolocation systems using angle-of-arrival techniques must also deploy specialized antennas. These antennas are in addition to the ones used by the cellular base station. The installation of additional antennas along with the requirement of receiving authorization from local zoning boards for installing the antennas makes angle-of-arrival systems costly.

In addition to the above background, the following references are useful in understanding the environment of the present invention.

J. R. Treichler and M. G. Larimore, "New Processing Techniques Based on the Constant Modulus Adaptive Algorithm, " *IEEE Trans. Acoust., Speech, Signal Processing*, vol. ASSP-31, pp. 349–472, Apr. 1983

J. R. Treichler and Brian G. Agee, "A New Approach to Multipath Correction of Constant Modulus Signals," *IEEE Trans. Acoust., Speech, Signal Processing*, vol. ASSP-31, pp. 459–471, Apr. 1983

Ohgane et al., "An Implementation of a CMA Adaptive Array for High Speed GMSK Transmission in Mobile Communications," IEEE Trans. on Vehicular Tech., vol. 42, no. 3, pp. 282–288, Aug. 1993

B. Widrow, J. M. McCool, and M. Ball, "The Complex LMS Algorithm,"*Proc. IEEE*, vol. 63, pp. 719–720, Apr. 1975

Ralph Schmidt, "Multiple Emitter Location and Signal Parameter Estimation," *IEEE Trans. Antennas and Propagation*, pp 276–280, Mar. 1986

SUMMARY OF THE INVENTION

The present invention is a location system and method for identifying locations of emitters in a service area where the service area is divided into coarse areas. The location method is performed by searching to identify active emitters in the service area, finding the coarse areas in which active emitters are located, selecting using selection criteria to designate one or more of the active emitters as selected emitters, measuring emitter signals with a plurality of sensors, each sensor at a different location, tasking groups of the sensors, one group of tasked sensors for each corresponding selected emitter, where tasked sensors for a particular group are chosen from the plurality of sensors based upon the capability of the tasked sensors to intercept emitter signals from a coarse area in which the corresponding selected emitter is located, each tasked sensor of the particular group taking a measurement on an emitter signal transmitted by the corresponding selected emitter, and processing to determine the location of each selected emitter based on the measurements from the group of tasked sensors for the corresponding selected emitter.

In the present invention, not all the cellular telephones (emitters) in a service area are located at any particular time. Rather, only those emitters that meet prescribed criteria are located thereby minimizing the system assets to perform geolocation. Selection criteria include one or more of the following quantities, each with a corresponding priority: coarse area (cell and/or sector), state (off, powered-up but not communicating, or call in progress), mobile identification number (the telephone number of the cellular telephone), and called number (the number that the operator of the cellular telephone dialed).

The invention uses error reduction techniques to provide accurate location information by mitigating the effects of co-channel interference, multipath propagation, and low received signal strength.

In embodiments of the present invention, the location system probes the selected emitter on the forward voice channel which causes it to transmit on the reverse voice channel at a different frequency, at a higher transmit power, or with a digital order confirmation message to assist in the location operation. If a call is not in progress, the location system probes it on the forward control channel which causes it to transmit a page response on the reverse control channel.

The present invention provides the capability to locate a plurality of mobile cellular telephones each emitting prescribed transmissions over their individually assigned control and voice channels based upon the air interface protocol standards set by the cellular industry. The invention locates cellular telephones using low cost RF and digital signal processing components, novel signal measurement techniques, and, in the preferred embodiment, new techniques for working cooperatively with the mobile switching center to accurately locate cellular telephones. The invention uses the existing antennas of cellular base stations thereby minimizing the installation cost.

The invention is capable of locating cellular telephones actively engaged in a call or paging cellular telephones that are powered on and can be ordered to initiate transmissions. The location apparatus and methods described herein may be used for several protocols such as TACS, AMPS, DAMPS (TDMA), GSM, CDMA and PCS 1900. Detailed descriptions of an AMPS and DAMPS embodiments are disclosed. Many location applications are apparent: 911 emergency, fleet tracking, VIP tracking, road-side assistance, cellular subscriber zone billing to mention a few. Others have been proposed and are made possible through this invention.

The invention described herein combines the technique of time-difference-of-arrival (TDOA) and angle-of-arrival (AOA), with measurements of signal strength, Doppler frequency shift, chirp, multipath presence, and other signal attributes at multiple receiving stations to accurately estimate the location of mobile cellular telephone operating within a cellular telephone system. The invention provides robust and accurate cellular telephone location estimations under varying environmental conditions through digital signal processing techniques to mitigate the effects of the signal environment and signal propagation conditions normally encountered in the cellular frequency bands. In addition, the invention uses specialized location estimation techniques which account for various geographic conditions such as the location of receiving sites relative to the mobile. The invention interfaces with the primary components of a cellular system in a cooperative fashion to minimize the amount and cost of location equipment and maximize the utilization of location assets. It uses a new technique based on a narrowband "~search and locate~" strategy. This strategy employs a process to "~search~" for specified call events or mobile identification number (MIN) activity (retrieving call data such as the frequency that the mobile is transmitting on and "~coarse~" geographical location consisting of cell and if available, sector) and "~locate~" that is, perform location measurements and compute "~fine~" location, whenever the specified event or activity occurs. In this manner, the location measuring assets are only applied to locating mobile telephones which have been identified as requiring location and specifically allows high priority call events such as E911 to be given highest priority. In addition, it avoids the need to monitor all 21 reverse control channels continuously therefore making the equipment at the cell site less complex and lower cost.

The search technique can be performed by a mobile location sensor locally at each cellular base station or can alternately be performed by the mobile switching center (MSC) which forwards the appropriate call events to the location system for location processing. A key attribute of this "~search and locate~" invention is that it uses narrowband receivers and digital signal processing allowing for a broad deployment of location capability at a minimum cost. In addition, the narrowband receivers are dynamically connected to the cellular base station antennas pointing in the coarse direction of the cellular telephone to be located to maximize the receive signal level. To further reduce the cost of the mobile location sensors, this invention employs an extensive dynamic calibration process at the mobile location sensor. The calibration process effectively compensates for variations in each sensor due to receiver passband characteristics, temperature changes, component aging, RF cable variations, and component replacement, thereby allowing the use of low cost components in the mobile location sensors. This also reduces the manufacturing and maintenance costs of the mobile location sensors.

In urban and suburban environments, a cellular telephone is often visible from 5–20 cell sites, and is visible from at least 3 sites in 98% of the cases. There are distinct advantages to having mobile location sensors capable of both time-of-arrival (TOA) and AOA measurements for mobile cellular telephone location. TOA location systems require the cellular telephone to be received by three or more location sites, while AOA requires two. TOA can be combined with AOA to improve location accuracy when only two mobile location sensors receive the cellular telephone's transmitted signal. This hybrid approach has a significant advantage, for example, in scenarios where cells sites are positioned along a straight highway. In this scenario, it is likely that only two sensors will receive the mobile's transmission making TOA only techniques ineffective and AOA only techniques suffer from geometric dilution of precision. Combining TOA measurements with AOA measurements allows the mobile to be located with precision. Other examples can be readily seen.

The foregoing and other objects, features and advantages of the invention will be apparent from the following detailed description in conjunction with the drawings.

DETAILED DESCRIPTION

Figure 1:
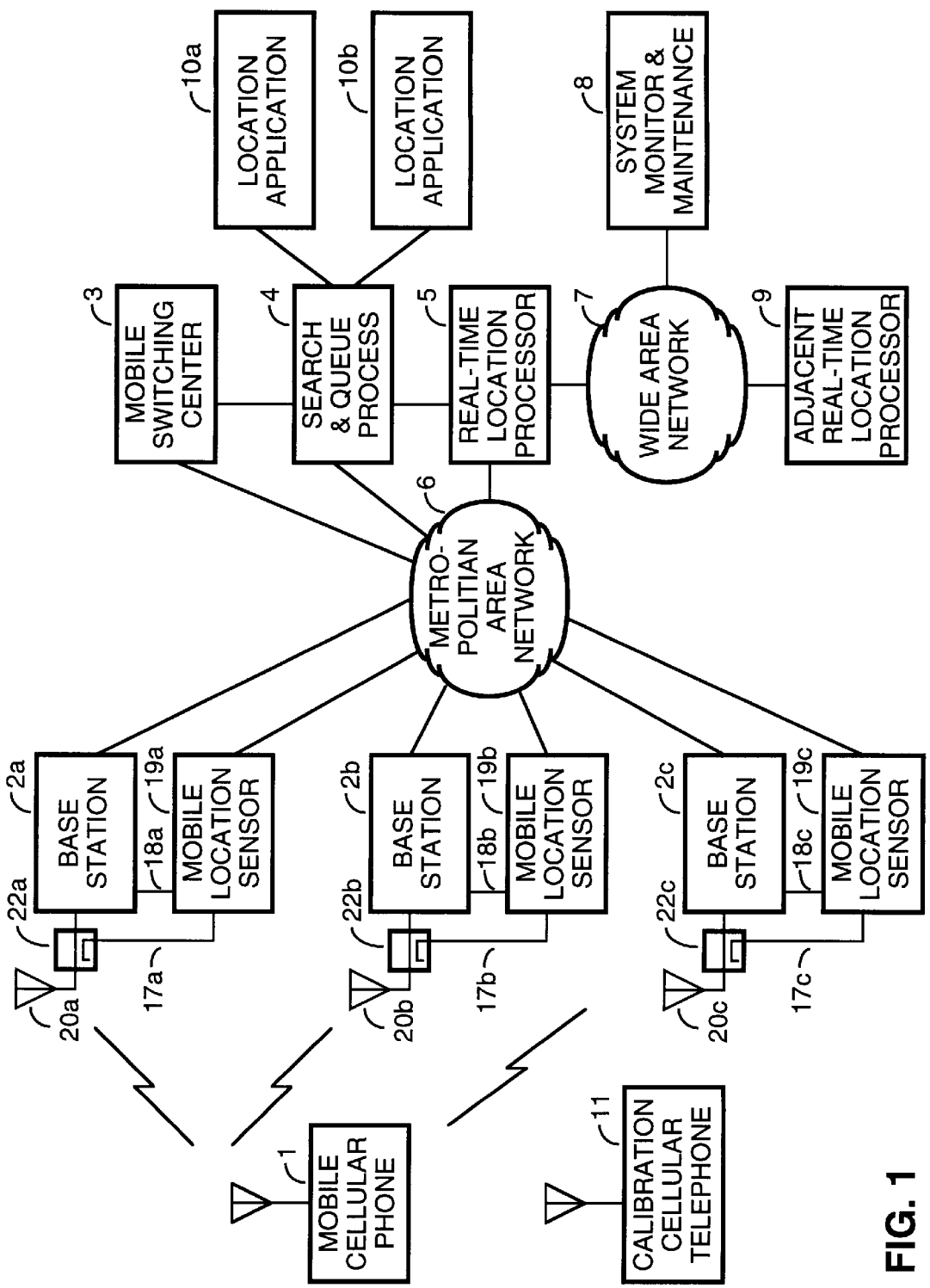
FIG. 1 depicts a block diagram of a cellular system including location sensors in accordance with the present invention.

Referring to FIG. 1, a preferred embodiment of the present invention is comprised of a network of several mobile location sensors (MLS) of which 19a, 19b, 19c are representative; cellular base stations of which 2a, 2b, 2c are representative; a central real-time location processor (RLP) 5; mobile switching center (MSC) 3; search and queue process (SQP) 4; location applications of which 10a, 10b are representative; system monitor and maintenance 8; and real-time network transmission facilities: metropolitan area network (MAN) 6 and wide area network (WAN) 7.

The mobile location sensors receive and measure signals transmitted from mobile cellular telephones 1 operating within the cellular system. The mobile location sensor RF input signals, 18a, 18b, 18c are acquired from the same antennas 20a, 20b, 20c used by the base station. The mobile location sensors may alternately be deployed separately from the cellular base stations with the appropriate receiving antennas and network connections located with the sensor. All MLSs connect to the RLP 5; via the cellular system real-time network transmission facility such as a metropolitan area network 6. There is one RLP 5 associated with each MSC 3. There are typically one or more MSCs serving a given geographical area and are typically interconnected via the WAN 7. The RLP accepts tasking from and returns location results to the search and queue process 4. The search and queue process may be an integrated part of the MSC function or alternately an integrated part of the RLP function. The RLP communicates with adjacent RLPs 9 associated with other MSCs via the WAN to process cellular telephones that can be received by base stations in both the local MSC 3 and the other MSCs. Location applications 10a, 10b request individual mobile telephone locations via a request-response model or alternately an a priori list of dialed digits or MINs. Mobile cellular telephone locations are forwarded to the location applications. An example of a location application is the public safety answering point (PSAP) for E911 calls. Maintenance and monitoring of the location system's operations are performed by the system monitor and maintenance function 8 which interfaces with the RLP via the WAN and to the sensors via the WAN and MAN. The typical transmission facilities for a cellular network are implemented over T1 links.

The preferred embodiment of this invention is a MSC-based configuration where call information is provided from the MSC to the search and queue process. An alternate approach is a standalone configuration where call activity is monitored by mobile location sensors at each cell site instead of coming from the MSC (the MSC would not provide call data to the search and queue process nor would it accept mobile station control messages). The RLP then implements the search and queue process which interfaces to the location applications. The MSC-based configuration is advantageous because it eliminates significant costs associated with reverse control channel (RECC) and forward control channel (FOCC) monitoring hardware and software in each MLS.

Figure 2:
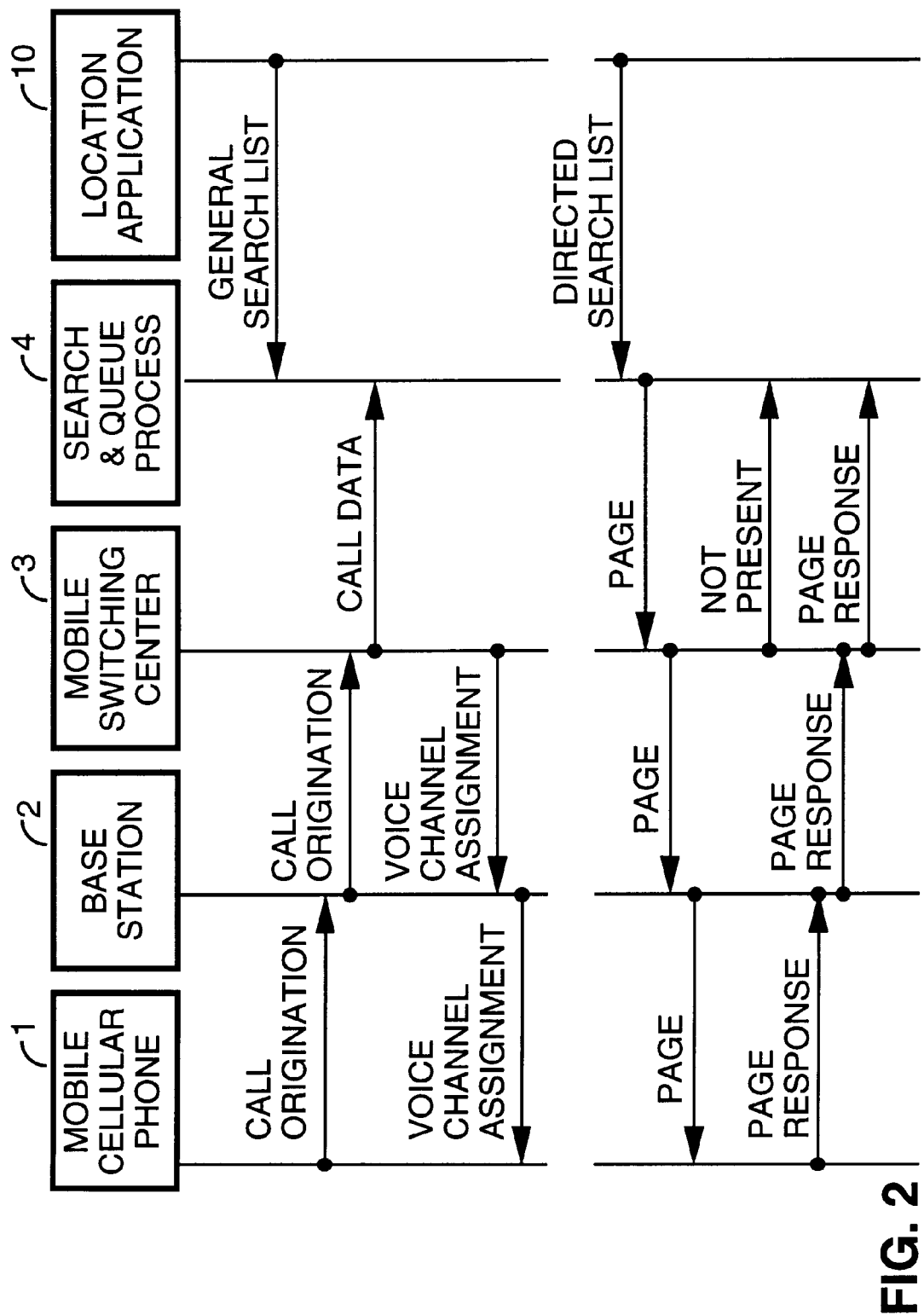
FIG. 2 depicts a chart of the sequencing of messages between the various components of this present invention to search for and select cellular telephones to be located.

The base stations 2 and MSC 3 constitute search means that identify the frequency that the cellular telephone uses, whether it is placing a call or can respond to a page response and that it is powered on and can communicate with a base station. The base stations 2 and MSC 3 constitute finding means to identify the coarse area of the cellular telephone. The search and queue process 4 contains the selection means to decide which emitters to locate. Referring to FIG. 2, the selection function is driven by a search list which constitutes selection criteria and is stored and maintained in the search and queue process 4. The search list is edited and updated by authorized location applications 10. The search list is comprised of two categories: general search list and directed search list.

The general search list is comprised of entries containing MINs (the 10 digit mobile identification number of the cellular telephone), dialed digits (the number that the cellular telephone calls), and/or, NPA/NXX numbers (all but the last 4 digits of a MIN), and combinations of the above with each entry having an assignable priority. Referring to FIG. 2, when a call origination is placed by the mobile cellular telephone 1, the MIN and dialed digits are communicated to the base station 2. This data along with the cell number and other parameters such as received signal strength are forwarded to the mobile switching center 3. The MSC verifies that the cellular telephone is an authorized subscriber, allocates a voice channel, and sends the call data (information on call originations including voice channel assignment, cell number/sector, dialed digits, and protocol) to the search and queue process 4 and sends the voice channel assignment to the base station 2 which relays it to the cellular telephone 1. The search and queue process monitors call activity by searching through call data from the MSC to select calls of interest and determine a "~coarse area~" which consist of cell site and/or sector where the mobile cellular telephone is active. The coarse area may have a resolution smaller than a sector if such information is available from the MSC.

Whenever call data satisfies the general search list criteria, the search and queue process automatically schedules a location request and optionally enters an entry in the directed search list to track the call.

Referring to FIG. 2, the directed search list is comprised of entries containing MIN, coarse geographical area (cell and/or sector), tracking criteria (determine the location once or periodically find the location during the entire call), termination criteria (phone not in the MSC service area, number of required locations exceeded, call has ended, and telephone doesn't respond to a page) and combinations of the above with each entry having an assignable priority. To search for a specific cellular telephone, the location application 10 adds an entry to the directed search list which is maintained on the search and queue process 4. To track the location of a cellular telephone while a call is in progress, an entry would be added to the directed search list with a termination criteria of locating the cellular telephone every so many seconds until the call ends. The MIN to be located may be related to an emergency 911, VIP tracking, cellular telephone location in support of law enforcement, fleet tracking, or other revenue generating applications. If the cellular telephone is powered up but not making a call, it is paged and if it responds to a page, the search and queue process automatically schedules a location request. When the termination criteria is satisfied, the directed search entry is automatically removed from the directed search list. Whenever a call origination matches an entry on either the general or directed search list, the cellular telephone is placed on a locate queue based on its priority. High priority requests are placed at the top of a queue and serviced first to insure timely response of the mobile telephone's location. E911 having the highest priority. The search and queue process uses the locate queue to allow for call activity "¯burst¯" condition such as might be encountered when several E911 calls are placed for the same emergency. When the instantaneous request rate exceeds the location rate of this geolocation system, the number of entries or requests in the locate queue would increase. After the burst condition subsided, the instantaneous request rate would drop, the backlogged requests would surface to the top of the locate queue, and the requests would be serviced. The technique of queuing is employed since most cellular telephone calls are a couple of minutes long and location measurements take less than a second, thereby allowing the measurement system to collect location data before the call ends.

Continuing with FIG. 2, for directed search entries, if a call is not active, the search and queue process 4 sends a page request to the MSC 3 which relays the page to the base stations 2 which in turn issue pages to the cellular telephone 1 on the forward control channels. A page is one of several mobile station control messages. If the cellular telephone is not powered up or is not communicating with any base stations, a time out occurs and the MSC tells the search and queue process that the MIN is not present. Otherwise, the cellular telephone sends a page response to a base station 2 on the reverse control channel. The page response is one of many order confirmation messages. The base station 2 relays the page response to the MSC and the MSC relays it to the search and queue process 4. Whenever a page response satisfies the directed search list criteria, the search and queue process automatically schedules a location request.

FIG. 2 shows how an MSC-based location system searches for, finds the coarse area of, and selects cellular telephones to be precision located for both general and directed search lists. After the selection criteria has been met, FIG. 3 shows how the location system geolocates precisely the cellular telephone.

Figure 3:
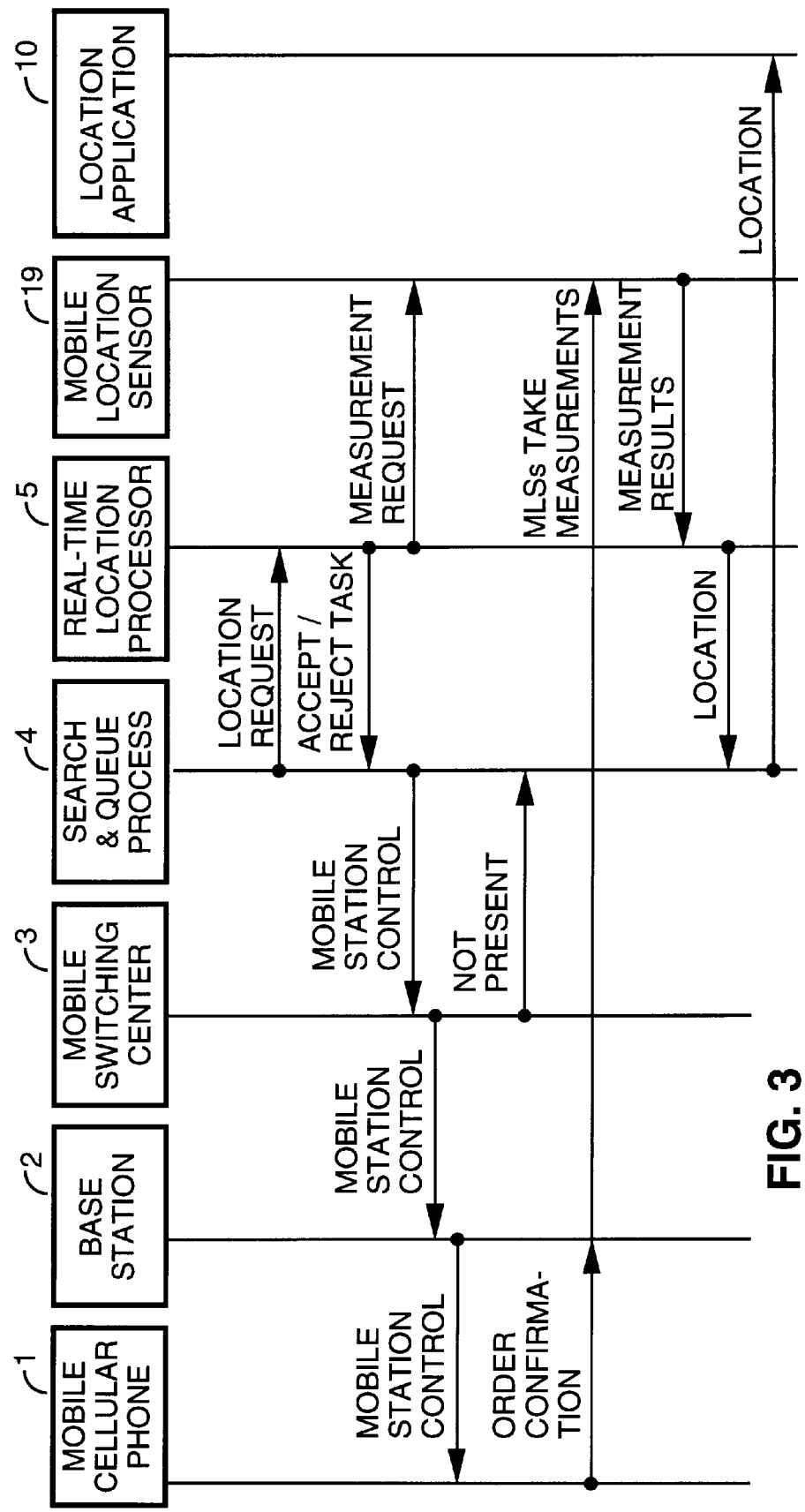
FIG. 3 depicts a chart of the sequencing of messages between the various components of this present invention to task sensors, take measurements, and locate emitters.

As shown in FIG. 3, the search and queue process 4 takes an entry from the top of the locate queue and issues; a location request to the RLP 5. The location request includes a start time and duration window within which the mobile order conformation should occur. The real-time location processor arbitrates between required and available mobile location sensors for the proposed time window and responds to the search and queue process with an accept or reject for the issued location request based on whether the location system can make the measurements within the specified time period. Some mobile location sensors may be scheduled to locate other cellular telephones for the proposed time interval and would therefore be unavailable. If the request was rejected, the search and queue process will schedule the request at a later time. If the request was accepted by the RLP, the search and queue process issues a mobile station control request to the MSC 3. The MSC issues the mobile order request to the base station 2. Meanwhile, the RLP 5 requests measurements from the MLSs 19 in the vicinity of the cellular telephone 1. The base station then transmits the mobile order request to the mobile cellular telephone 1 to cause the mobile 1 to transmit an order conformation message. For active calls, the mobile station control request could be an audit, frequency change, or power level change on the forward voice channel. Otherwise, if the cellular telephone is not currently engaged in a call, the mobile station control request could be a page on the forward control channel. The mobile location sensor 19 detects the order confirmation and takes measurements on the mobile's signal during transmission of the order conformation message. For the AMPS protocol, the mobile's response consists of a digital data stream that FSK modulates the RF carrier.

The results of each sensor's measurements are reported to the RLP. The RLP checks the quality of the results, removes measurements not meeting specified tolerances, estimates the mobile's location, and reports the results to the search and queue process. The search and queue process forwards the location and associated data to the requesting location application 10. In the event that the mobile telephone is not present, that is, not powered on or not in the system, the MSC will report this to the search and queue process as shown in FIG. 3 which will subsequently report this condition to the requesting location application 10.

The mobile location sensors may indicate in their response to the real-time location processor that the signal level was weak. In this case, the search and queue process requests a mobile power level increase via the MSC and tasks the RLP to make a second location measurement under improved signal level conditions and therefore improve the location accuracy. The mobile location sensors may also indicate that high levels of RF multipath or co-channel interference were detected. In this case, the search and queue process requests a voice channel change via the MSC and tasks the RLP to make a second location measurement under different RF multipath conditions and combine this with the first location estimate to improve the overall location estimation.

In a standalone configuration (not shown in FIG. 2 nor FIG. 3), the mobile location sensors monitor the reverse control channel and the forward control channel to obtain call data which is relayed through the RLP to the search and queue process which compares the call data against the general search list criteria. Any calls that satisfy general search list entries cause the search and queue process to issue a location request to the RLP. The RLP accepts or rejects the requests based on the availability of the mobile location sensors. Rejected requests are resent at a later time. The mobile location sensors take measurements on the signal from the cellular telephone and report these to the RLP. The RLP checks the quality of the results, removes measurements not meeting specified tolerances, estimates the mobile's location, and reports the results to the search and queue process. The search and queue process forwards the location and associated data to the requesting location application. A standalone configuration does not have the advantage of the mobile station control request (probe) approach which causes a unique transmission from the cellular telephone that is readily distinguished from other signals on the reverse voice channel, especially from co-channel interference. Another embodiment is the MSC-assisted configuration which has the monitoring capabilities of the standalone configuration along with probing capabilities shown in FIG. 3.

Figure 8:
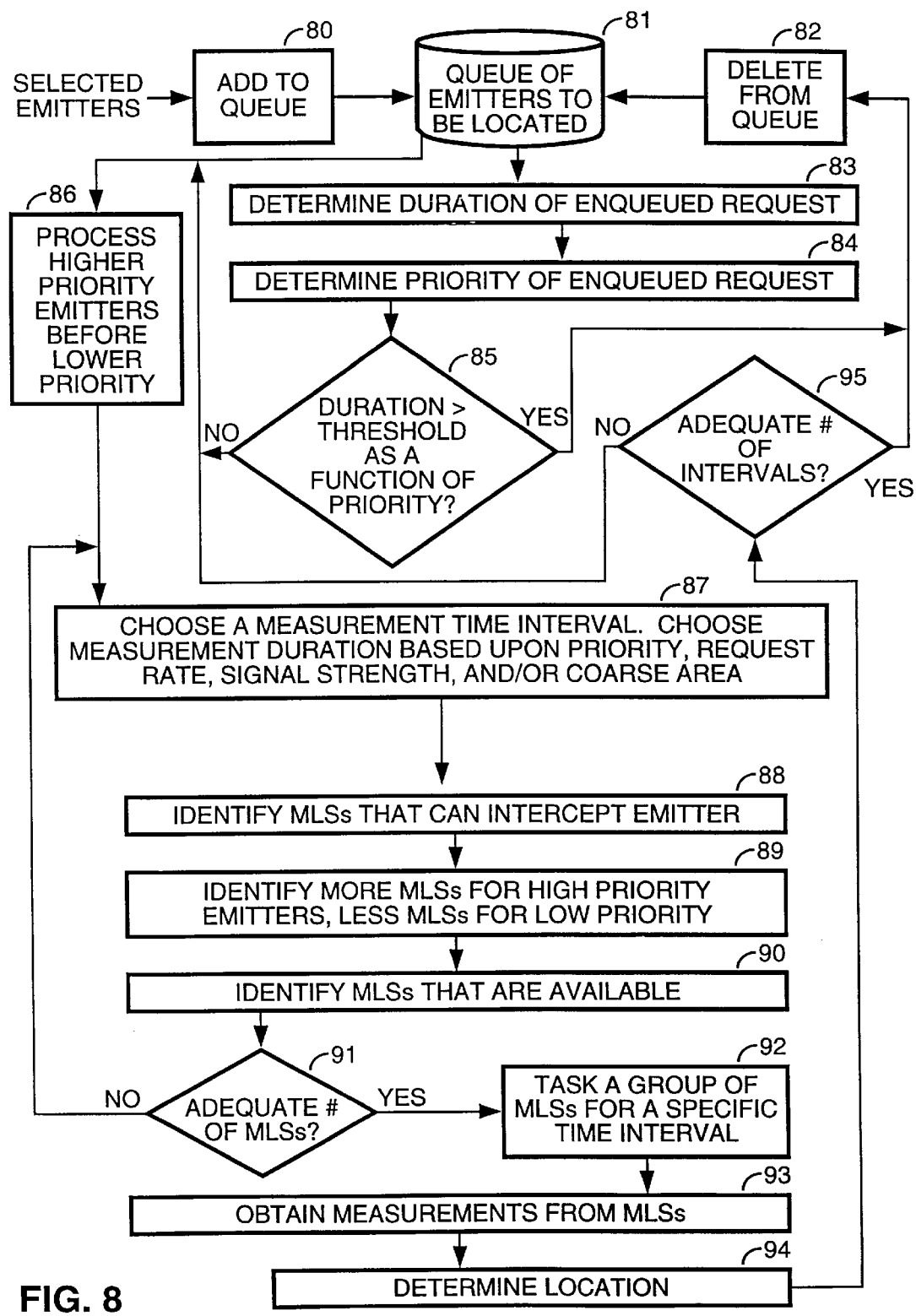
FIG. 8 depicts a flow chart to manage a queue of emitters to locate and to select mobile location sensors to task.

A method for tasking and queuing of location measurements is shown in FIG. 8. This method provides a tasking scheme for allowing higher priority emitters to be located before lower priority emitters. It also provides a means for determining which sensors are to be tasked given the coarse area. Selected emitters to be located constitute location requests and are added 80 to a locate queue 81. The time difference between when each location request was added to the 26 queue and the current time is determined 83. If 85 this duration exceeds a predefined threshold which is a function of priority 84, then the request is deleted 82 from the queue. The locate queue 81 is sorted 86 so that higher priority emitters are located before lower priority emitters. A measurement time interval is proposed 87. The duration of the measurement time interval is variable 87 and is a function of priority, location request rate, received signal strength, and coarse area. The mobile location sensors that can most likely intercept the selected emitter's signal are identified 88. The number of sensors to be tasked are modified 89 based on the priority of the selected emitter. Each sensor to be tasked must be available 90 during the proposed time interval. If 91 too few sensors are available, then another measurement time interval is proposed 87. The identified sensors are sent a tasking command 92 for the proposed measurement time interval and the measurements are collected from the tasked sensors 93. The results from the sensor measurements are used to determine the location 94 of the selected emitter. The number of measurement time intervals for the selected emitter are checked against a defined number of required intervals 95. The sensors take one or more sets of measurements at different time intervals and these sets of measurements are used to determine the emitter location. If an adequate number of intervals have been completed then the emitter is deleted 82 from the locate queue 81.

Figure 7:
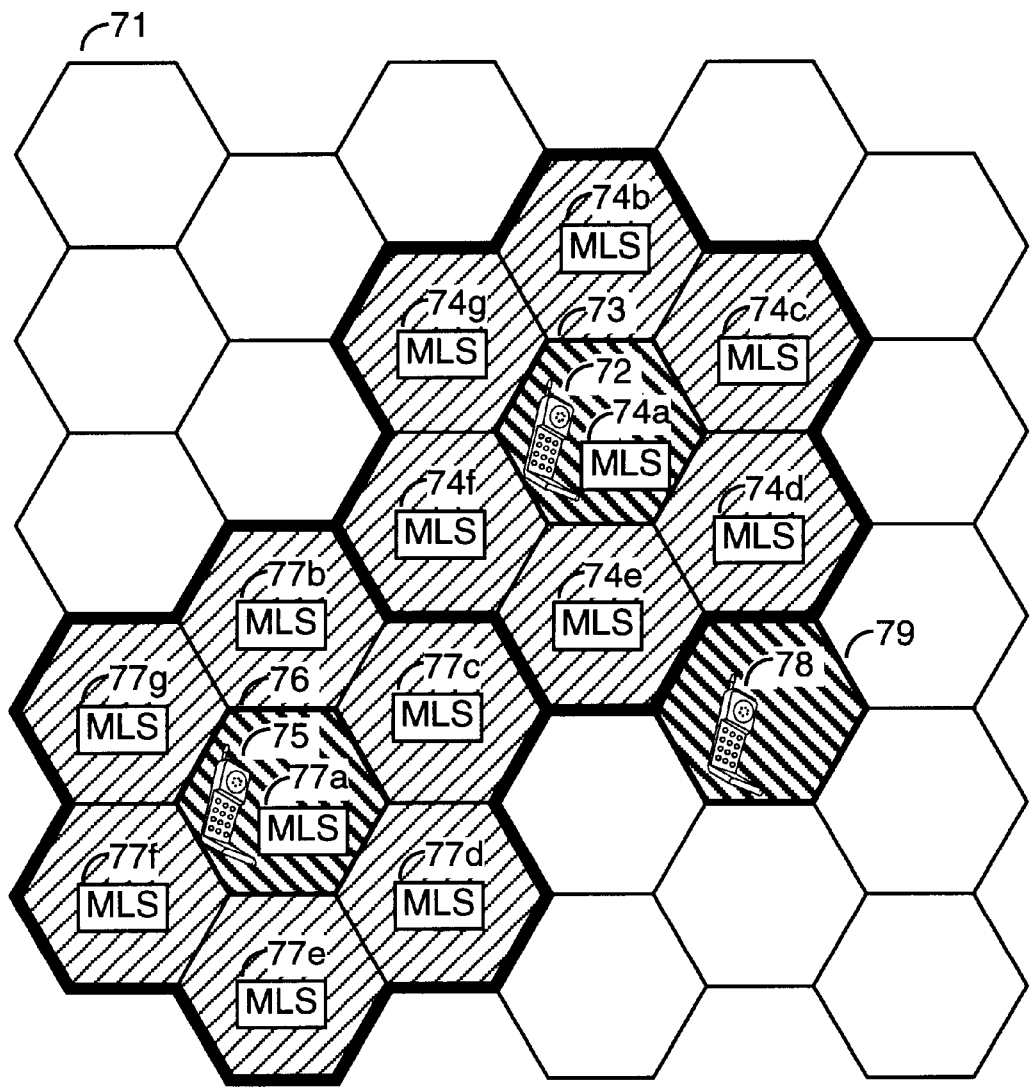
FIG. 7 depicts; a diagram of a service area for a cellular system formed from a plurality of coarse areas and indicates which mobile location sensors are tasked to locate specific cellular telephones.

FIG. 7 shows how the location system selects MLSs to locate mobile cellular telephones. The service area 71 is a geographical region in which the location system operates. The hexagons of FIG. 7 represent the various coarse geographical areas in which a cellular telephone might be. A cellular telephone 72 places a c(all and communicates with a base station. Based on which base station and/or sector of that base station is used to communicate with the cellular telephone 72, the MSC determines the coarse area 73 of the cellular telephone. There are many techniques to determine the coarse area, one of which is disclosed in U.S. Pat. No. 5,390,339. The coarse area information is used by the RLP to determine which MLSs would be tasked to find the precise location of the cellular telephone. MLSs 74a, 74b, 74c, 74d, 74e, 74f, and 7g would be tasked by the RLP to locate cellular telephone 72 since they are in the vicinity of its coarse area 73. Likewise, MLSs 77a, 77b, 77c, 77d, 77e, 77f, and 77g would be tasked by the RLP to locate cellular telephone 75 since they are near the coarse area 76 corresponding to the cellular telephone 75. Location techniques based on AOA should use at least two MLSs and techniques based solely on TDOA should use at least three MLSs. MLSs 74 and MLSs 77 may be tasked to take measurements during the same time interval since they have no MLSs in common. The RLP would not task MLSs in the vicinity of coarse area 79 that contains cellular telephone 78 for the same time interval as MLSs 74 since both taskings would need to use MLS 74d and MLS 74e. At another time interval, when the necessary MLS resources are available, the RLP would task the MLSs to take measurements on cellular telephone 78.

Search and Queue Process

The search and queue process of the location system is the primary interface with MSC and with the location applications. The search and queue process is hardware independent; it may be implemented in the MSC, in the RLP, or on a separate processor. The primary functions of the search and queue process are.

Receive call data from the MSC (MSC-based embodiment) or from the RLP (standalone embodiment).

Maintain a general search list and directed search list with entries that allow high priority call events such as E911 to get serviced first by the location system.

Authenticate the location applications and then edit the search lists as directed by location applications.

Maintain a locate queue which allows higher priority location requests to be serviced before lower priority requests, buffer requests in the locate queue, and use the locate queue to task the RLP.

Issue mobile station control request messages to the MSC.

Forward RLP location results to requesting location application.

Real-Time Location Processor

There is one RLP associated with each MSC. The RLP is the central control function for coordinating all mobile location sensor activities. It also computes location estimations based on the results of each mobile location sensor measurement. The RLP maintains a measurement pipeline which controls all aspects of the measurement coordination between mobile location sensor including arbitrating mobile location sensor adjacency conditions to maintain a full measurement pipeline. The primary functions of the RLP are:

Receive location requests from the search and queue process.

Choose sensors to be tasked based on the priority of the selected emitter.

Arbitrate mobile location sensors availability between adjacent sites and respond to the search and queue process as to whether the location requests can be satisfied.

Control all mobile location sensors associated with the RLP. Maintain synchronous location measurement cycles among all mobile location sensors.

Receive measurement results from mobile location sensors.

Compute location based on TOA and/or AOA measurements and their quality factors and report emitter location to the search and queue process.

In the standalone configuration, forward call data from the mobile location sensors to the search and queue process.

Forward location requests to adjacent RLP 9.

If acting as an adjacent RLP 9, forward measurement results from mobile location sensors to the local RLP 5.

Receive configuration information from the system monitor and maintenance 8. Forward status to the system monitor and maintenance 8.

Mobile Location Sensor

The mobile location sensor 19 is an electronic unit at the base station that intercepts the signal from a cellular telephone 1 to measure its TOA and/or AOA. The MLS may also be deployed in an enclosure other than a base station for those areas where an increased number of MLSs are necessary so that the transmissions from cellular telephones can be intercepted by multiple MLSs and to improve location accuracy. There are two system configurations: MSC-based and standalone each having a corresponding MLS hardware configurations shown in FIG. 4 and FIG. 5 respectively. In an MSC-based system configuration, the search and queue process receives call data from the MSC. In a standalone system configuration, the various MLSs search the reverse control channels for call originations by cellular telephones and the forward control channels for voice channel assignments and relays to the search and queue processor through the RLP those calls which satisfy specified criteria. In either configuration, the RLP accepts location requests from the search and queue process and then tasks all the MLSs in the vicinity of the cellular telephone to take measurements on cellular telephone transmissions.

Mobile Location Sensor in a MSC-based Configuration

Figure 4:
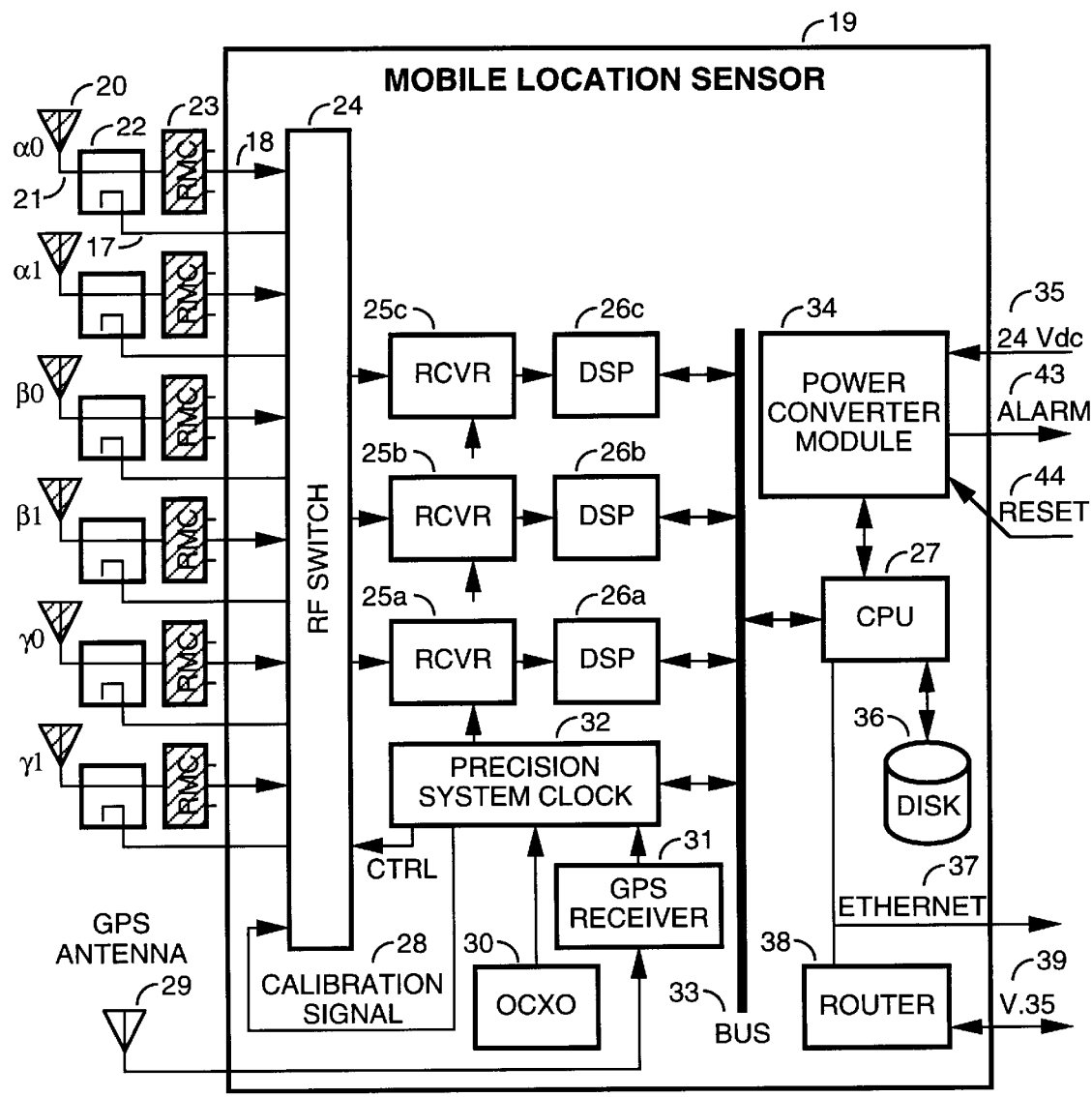
FIG. 4 depicts a block diagram of a switch-based mobile location sensor of the present invention.

FIG. 4 shows an mobile location sensor 19 and its interfaces to the base station in a MSC-based approach. The base station equipment is cross-hatched and consists of the receive antennas 20, cables 21, and Rf multicoupler 23. Base stations typically have two antennas per sector each separated by 5 to 10 feet pointing in the same direction for diversity reception. In FIG. 4, antennas $\alpha 0$ and $\alpha 1$ are the two diversity antennas for sector α. Base stations may have one or more sectors. FIG. 4 shows a typical configuration of three sectors: α, β, and γ, each pointing in different compass directions such as 30°, 150°, 270° relative to north. The antennas 20 may collect transmissions from cellular telephones from any direction (omni-directional) or from a sector (directional). Typically, the beamwidth of a directional antenna in a three sector base station is 120° so that as the mobile cellular telephone moves around the cell, its transmissions can be intercepted by one or more directional antennas. The low loss cables 21 bring the signals to the RF multicoupler (RMC) 23 where they are amplified, non-cellular signals are filtered out by pre-selection filters, and distributed to other electronics of the base station. The directional couplers 22 are inserted just prior to the RF multicouplers 23 in the base station to permit injection of a calibration signal 17 into the RF multicouplers. One of the outputs from each RF multicoupler 23 is connected using RF coaxial cable 18 to the mobile location sensor 19.

The cellular telephone anti-fraud system as described in U.S. Pat. No. 5,448,760 also interfaces to the base station in a similar fashion: injecting call tear down signals into a directional multicoupler prior to the RF multicoupler and RF fingerprinting RECC signals from the RF multicoupler.

The RF switch 24 electrically connects any receiver 25 to a calibration signal 28 or any one of the RF multicoupler 23 outputs with each RF multicoupler output coming from a different antenna. FIG. 4 shows a non-blocking RF switch 24 with six antenna inputs, one calibration input 28, and three outputs to receivers 25a, 25b, and 25c. Other embodiments would have from 1 to 6 receivers; only the three receiver embodiment is shown in FIG. 4.

The MLS use; narrowband or wideband receiver technology. The preferred embodiment uses low cost narrowband technology, meaning that the bandwidth throughout the receiving channel matches the bandwidth of the mobile's signal. In AMPS and DAMPS (TDMA) this is 30 kHz and in CDMA this is 1.25 MHz. The various protocols such as AMPS, TACS, TDMA, GSM, and CDMA, would each use a receiver with a different frequency range and bandwidth. A wideband receiver has two or more channels processed simultaneously through the same IF bandwidth with digital receivers or digital sub-band tuners providing the final frequency selection. Typical bandwidths for wideband receivers are 630 kHz (all control channels) or 12.5 MHz (all voice channels). For the same total system cost, many more narrowband embodiments of the mobile location sensor can be deployed than wideband embodiments. Greater deployment of mobile location sensors provide improved signal detection and location accuracy especially in difficult RF environments such as dense urban or intra-building.

In those base stations that have a single omni-directional antenna, a mobile location sensor would contain only one receiver 25a to collect time of arrival measurements. A two receiver MLS would be used in base stations with two omni-directional diversity antennas. Angle of arrival measurements in this invention require the base station to have two or more antennas and they would be processed by two or more receivers. With two receivers, the phase difference between one pair of antennas can be simultaneously measured. With three receivers, the phase between three pairs of antennas can be measured; thus three receivers provide a three fold improvement in measurement capacity when compared with two receivers.

The receivers 25 are all tuned to the same frequency as the cellular telephone's transmit frequency. The receivers downconvert a narrowband portion of the RF spectrum to an intermediate frequency (IF) and digitize the IF with an analog-to-digital (A/D) converter thereby representing the instantaneous voltage of the IF waveform with numerical quantities at a periodic rate. The local oscillators of the receivers are derived from a common source, the precision system clock 32, so that they all have the same frequency. The A/D clocks have the same phase, so that they sample the IF waveform at the same time.

The A/D samples are sent from the receivers 25 to the digital signal processors 26. There is one DSP 26 for each receiver 25. The receivers tag the first A/D sample of a measurement cycle. If the A/D samples were 18 bits long and the DSP accepts 24 bits from the A/D, some of the remaining 6 bits are used for this tagging information. Tagging permits the various DSPs to examine the tag bits and thereby begin data collection and processing on a set of A/D samples spanning the same time interval.

Each DSP 26 scans the A/D samples for the tag bit that indicates the beginning of a measurement cycle, converts the real A/D sequence into a complex sequence consisting of in-phase and quadrature components, decimates the complex sequence to reduce the sample rate, applies an equalization filter, applies a time-shift filter, corrects for receiver frequency errors, converts the samples to the floating point format of the central processing unit 27 (CPU), and forwards the samples (hereafter called the data vector) to the CPU. The CPU 27 communicates with the DSPs 26 across a bus 33. The equalization filter compensates for the variation in group delay from receiver to receiver end across the receiver's IF passband. The time it takes for a signal to propagate through a receiver may vary from one receiver to another. Since this time delay through a receiver would affect the location measurements, an equalization filter is applied that removes the delay differences so that all the receivers have the same group delay characteristics. An equalization filter is represented by a set of complex filter coefficients or finite impulse filter (FIR) taps. The time it takes for a signal to propagate through an RMC may vary from one RMC to another and may be a function of frequency. There is a separate time-shift filter corresponding to each RMC 23 that compensates for the delay through the RMC 23. The delay through each RMC is measured at various unoccupied frequencies by injecting a calibration signal into the directional coupler 22 which flows through the RMC, RF switch, and receiver; and by measuring the time delay between the calibration signal and the output of a receiver.

The CPU 27 accepts the measurement data from the DSPs 26, performs further data reduction on the measurements, and forwards the results to the real-time location processor 5 across interfaces such as ethernet 37 or V.35 39. The CPU accesses configuration information, equalization data, calibration tables, along with software programs from a hard disk 36. The CPU uses the power converter module 34 to signal an alarm 43 (mobile location sensor failure) to a base station processor. Likewise, the base station processor can reset the mobile location sensor 19 by sending a reset signal 44 to the power converter module. The power converter module also accepts +24 Vdc power 35 from the base station and supplies the various circuit cards within the mobile location sensor with regulated power. The CPU 27 sends commands to all the equipment within the mobile location sensor 19 to have them operate in a coordinated fashion. It controls the precision system clock 32, tunes the receivers 25, configures the RF switch 24, download software to, controls, and receives data from the DSPs 26, and outputs ethernet messages 37.

Each mobile location sensor 19 must operate synchronously with adjacent mobile location sensors. All must take measurements at the same time to ensure that the collected data comes from the same cellular telephone. In addition, the time when each A/D sample is taken must be known accurately in order to support time difference of arrival calculations. This time synchronization is achieved using the global positioning system (GPS) signals transmitted from orbiting satellites. The GPS antenna 29 is mounted outside the base station in such a fashion so as to permit it to unobstructively collect the GPS signals. The GPS receiver 31 processes these signals and outputs a 1 pulse per second signal to the precision system clock 32. Although the various mobile location sensors are dispersed geographically, the pulses from the GPS receiver all happen at the same time and thereby synchronize the various precision system clocks 32. In addition, the GPS outputs an RS-232 data stream that contains the location of the GPS antenna and the time of day. The oven controlled crystal oscillator (OCXO) 30 supplies a low phase noise time base signal to the precision system clock. A typical frequency for the OCXO is 10 MHz. The A/D conversion clock and the receiver's local oscillators are phase locked to the OCXO. The precision system clock measures both the number of OCXO clock cycles and number of GPS pulses since power-on reset each time the 1 pulse per second GPS signal occurs. The CPU 27 then applies linear regression to a recent set of these OCXO measurements to determine the frequency and phase of the OCXO. The frequency error of the OCXO 30 is forwarded to the DSPs 26 so they can frequency shift the data vector to remove the frequency error. The phase of the OCXO in each MLS contributes to the time of arrival error and by knowing the OCXO phase, this error source can be removed. The precision system clock 32 generates the A/D conversion clock, starts measurement cycles generates the tag bits for the A/D converters, records the time when a measurement cycle began, and stops a measurement cycle. At the beginning of each measurement cycle, the precision system clock 32 configures the RF switch 24. The precision system clock 32 also generates a calibration signal 28 which is routed through the RF switch 24 to the directional couplers 22 for injection into the RF multicouplers 23 or is routed to the receivers 25. The calibration signal permits the measurement of the time delay through the various system components. This time delay measurement can be the absolute time delay when considering a specific RF path or a relative time delay difference between two RF paths. For TDOA measurements, the absolute time delay through an RMC is used to compute the time-shift filter for the DSPs. For ADA measurements, the relative time delay difference between two RF paths is manifested as an electrical phase difference which must be taken into account.

Figure 6:
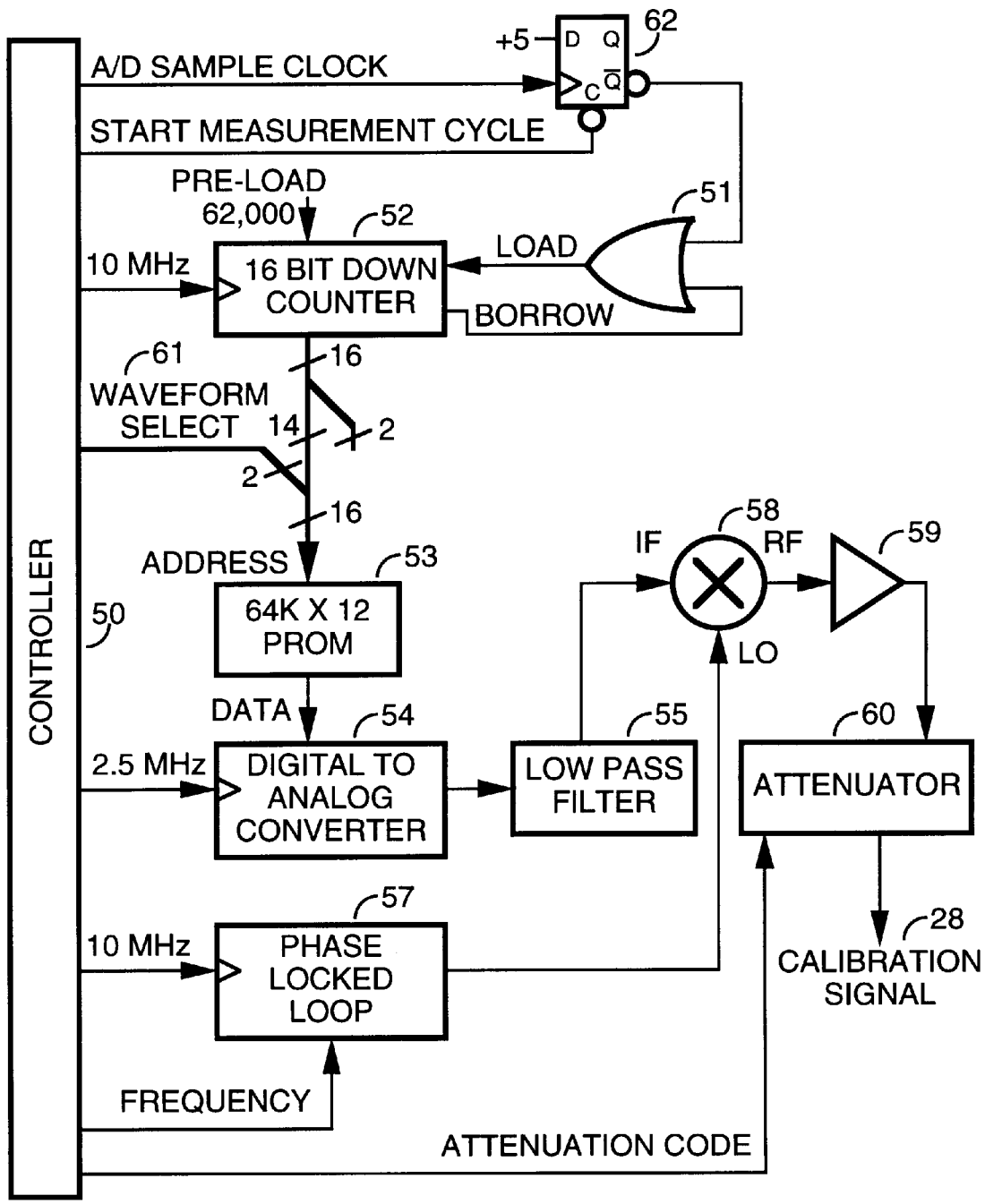
FIG. 6 depicts a block diagram one technique of synthesizing a calibration test signal.

FIG. 6 shows one technique of synthesizing a calibration test signal. Control circuitry 50 generates an A/D sample clock and a start measurement cycle signal. The first A/D sample of a measurement cycle clocks flip-flop 62 to start a measurement cycle and enables gate 51 to load a divide-by-62,000 counter 52. The counter 52 is driven by a 10 MHz clock signal and so its output period is 6,200 $\mu$s. The reciprocal of the 40 kHz receiver IF frequency is 25 $\mu$s. The counter period of 6,200 $\mu$s is a multiple of both 25 $\mu$s and the A/D clock period of 6.2 $\mu$s. The 14 most significant outputs of the counter are applied to the 14 least significant address lines of a 64K by 12 PROM 53. The two most significant address lines to the PROM 53 come from the control circuitry 50 and permit one of four waveforms to be selected by the two select lines 61. The PROM 53 outputs a sequence of 12-bit numbers representing the baseband calibration signal waveform. It consists of 93 tones, each 161.3 Hz apart (10 MHz÷62,000) ranging from 161 Hz to 15 kHz. The samples are routed to a digital-to-analog converter (DAC) 54 which converts the samples to an analog waveform at a 2.5 MHz rate. The in-band power spectrum of the DAC signal ranges from 161 Hz to 15 kHz. The values stored in the PROM are selected so that when the start measurement cycle signal is false, the DAC output is zero; and that when it is true, the in-band power is large and the out-of-band power is small. The DAC signal is low pass filtered in filter 55 to minimize the out-of-band frequency components that remain. The corner frequencies of the low pass filter are selected so that the filter's group delay does not vary considerably with temperature or component variation. The filtered DAC signal is applied to a balanced mixer 58 which up-converts the DAC signal to RF generating both upper and lower sidebands. The local oscillator for the mixer is supplied by the phase locked loop 57. The calibration signal's frequency components are from −15 kHz to +15 kHz relative to the local oscillator frequency. Typically the receiver 25 would be tuned to the same frequency of the phase locked loop 57. The RF signal is amplified in amplifier 59 and passed through a variable attenuator 60 to form the calibration signal 28. At the start of a measurement cycle, the calibration signal begins and the tag bit is inserted into the A/D converter data stream. The calibration signal is deterministic and periodic. A copy of the calibration signal as received by an ideal receiver is stored in the DSP memory. The DSP cross-correlates this reference sequence with the samples from the A/D converter of its associated receiver and computes the time delay between them. Or, the DSP computes the auto correlation matrix R of the A/D samples and the cross correlation vector P of the A/D) samples with the reference sequence to form the equalization filter coefficients: $H=R^{-1} P$. The equalization filter is periodically computed to account for temperature or aging of the receiver's components. If the calibration signal is reversed in time, applied to the receiver, and a cross correlation vector $P_R$ of the A/D samples with the reversed reference sequence is calculated, then the errors in the measurement of the group delay due to intermodulation products can be eliminated by averaging the forward and reverse cross correlation vectors: $H=R^{-1} (P+P_R)/2$. If the amplitude of the calibration signal is varied, the amplitude of the intermodulation products that fall in-band on top of other spectral lines of the calibration signal can also be estimated and eliminated.

The calibration signal can be simultaneously applied to two or more receivers. A data vector is captured for each receiver. The CPU computes the arc-tangent of the conjugate dot product between two data vectors corresponding to two different receivers to compute the electrical phase difference between them. This phase difference may be due to differences in the cable lengths between the RF switch and the receivers, the local oscillator phase within the receiver, or the passband characteristics of the receiver.

Mobile Location Sensor in a Standalone Configuration

Figure 5:
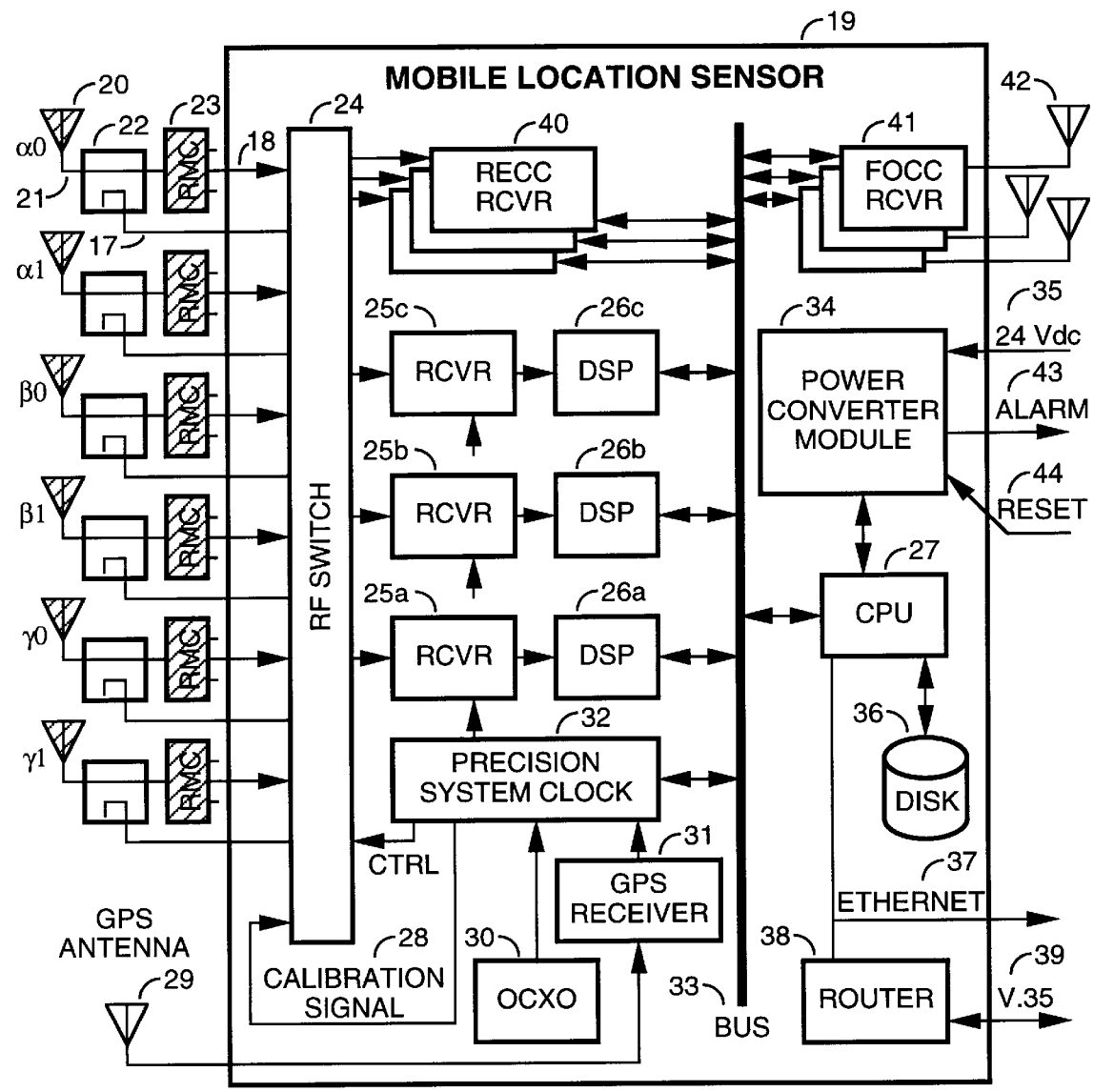
FIG. 5 depicts a block diagram of a stand-alone mobile location sensor of the present invention.

FIG. 5 shows the major components for the mobile location sensor in a standalone system approach. It consists of the same major components in the mobile location sensor of FIG. 4 plus RECC receivers 40 and FOCC receivers 41 with their associated FOCC receive antennas 42. For the various embodiments of the MLS that each handle a different protocol such as AMPS, TACS, TDMA, GSM, and CDMA, the RECC and FOCC receivers would be necessarily different. Base stations typically transmit one omni-directional FOCC at a specific frequency or transmit three FOCC signals at three different frequencies each on a different antenna sector known as simulcast or sectorized respectively. For simulcast configurations, there would be one RECC receiver 40 and one FOCC receiver 41 in the mobile location sensor 19. For sectorized operation, there would be three RECC receivers 40 and three FOCC receivers 41 in the mobile location sensor 19, each tuned to a different control channel for that base station. The RECC receivers monitor all the traffic on the RECCs extracting the MIN and the dialed digits. The FOCC receivers monitor the control information on the FOCCs extracting the MIN, supervisory audio tone color code (SCC), mobile station power level (VMAC), and assigned RF channel (CHAN). If a voice channel assignment is sent to a mobile station and if its MIN and/or dialed digits meet prescribed criteria, then an alert message is sent to the real-time location processor.

For emergency 911 cellular telephone location, the receivers 25 and DSPs 26 would only be used when a 911 call is in progress. Since 911 calls are infrequent, the receivers and DSPs may be idle for the majority of the time. During this idle time, the receivers and DSPs could be used for calibration or other applications such as RF fingerprinting to detect unauthorized access to the cellular telephone network as described in U.S. Pat. No. 5,448,760.

TDOA Processing

When tasked by the real-time location processor to take measurements on a cellular telephone, the mobile location sensor determines which sector points in the direction of the cellular telephone and the second best sector that may also be able to intercept the cellular telephone. The call data sent from the MSC to the search and queue process contain the cell and sector of the cellular telephone constituting the cellular telephone's coarse geographical area. The sectors are ranked with regards to their ability to intercept signals from the coarse geographical area. From this ranking, the best and second best sectors are selected. The RF switch is configured to connect two receivers to the two diversity antennas of the best sector and to connect the third receiver to an antenna of a second best sector.

The mobile location sensor operates in one of three modes for TDOA signal processing: idle, calibration, and gather. In the idle mode, it simply waits for tasking from the real-time location processor. In the calibration mode, it turns on the calibration signal, measures the time delay through the RMC at various unoccupied reverse voice channels (RVC) and RECC, and formulates equalization filters to compensate for the delay through the receivers 25 and time-shift filters to compensate for the delay through the RMCs 23. The time-shift filters may be a function of RMC and frequency channel. The filters are stored for use during the gather mode. The gather mode is used to collect the RF transmission of an RVC or RECC order confirmation message from the cellular telephone to the base station. The MSC 3 tasks the base station to have the cellular telephone respond to an audit, frequency change, or power level change. In response, the cellular telephone responds with an order confirmation message. An order confirmation message for the AMPS RVC is a 54.4 ms manchester encoded 10 kbps FSK modulated signal. It begins with 101 bits of dotting followed by 11 bits of synchronization. It can be detected by scanning the RVC for a sequence of data bits that match a bit pattern constructed from the last 37 dotting bits and the 11 synchronization bits. This FSK modulation is distinct from voice modulation and is infrequent on the RVC so that it is very unlikely that there would be a false cross-correlation; it is unlikely that there would be co-channel interference on a specific RVC from two different cellular telephones both sending the same order confirmation message within 100 µs of each other. For this reason, the mobile location sensor monitors the RVC until the order confirmation message occurs and then forwards to the real-time location processor just the time portion of the RVC that corresponds to the order confirmation message. This processing technique assumes that the MSC 3 will cause an order confirmation message while the mobile location sensors are collecting location data. Referring to FIG. 1, several mobile location sensors 19*a*, 19*b*, and 19*c* in the vicinity of the cellular telephone 1 are tasked by the real-time location processor 5 to collect location information. This tasking includes when to begin the measurement, when to end the measurement, and how much measurement data to return to the real-time location processor. The mobile location sensors search for an order confirmation message between the begin and end times which may be longer than the amount of measurement data to collect, since the timing of the order confirmation message may have some ambiguity; the delay through the MSC 3, base station 2, and cellular telephone 1 may vary. Referring back to FIG. 4, in response to such tasking, the CPU 27 begins a set of measurement cycles at the begin time and the DSP 26 collects data vectors, scans them for the specific bit pattern, and forwards them to the CPU 27. Upon detection of the bit pattern, the DSP notifies the CPU of the time when the bit pattern occurred and the CPU then calculates when the order confirmation message should stop. Not all the DSPs in all the tasked mobile location sensors will detect the bit pattern due to the distance between the cellular telephone and the base station, the transmit power of the cellular telephone, and the orientation of the base station antenna associated with the DSP. Those mobile location sensors that detect the bit pattern forward the stop time to other mobile location sensors performing measurements on the same cellular telephone. Data vectors are collected up to the stop time (the conclusion of the order confirmation message) or up to the end time (as specified in the tasking from the real-time location processor) which ever occurs first. This technique permits the collection of measurement data consisting of an RVC order confirmation message if one is present or voice plus SAT tone if one is not present. The CPU combines the data vectors from the various receivers, encodes the result, and send it to the real-time location processor 5. The time of the first A/D sample of the data vector would also be included in the message to the real-time location processor.

When deployed in a cellular network using TDMA protocol, the RVC consists of digitally modulated signals from up to 6 different cellular telephones. Each DSP demodulates the RVC to determine the time slots when the cellular telephone to be located is transmitting. This timing information is relayed to the CPU 27 so that only the data from the cellular telephone to be located is forwarded to the real-time location processor 5. Not all the DSPs in all the tasked mobile location sensors will detect the time slots due to low received signal strength, and so the time slot information, if detected, is forwarded to all adjacent mobile location sensors.

The mobile location sensors may also be tasked to collect measurement data on the RECC. This technique is used to locate cellular telephones that are powered up but not making calls. The Search and queue process 4 would task the MSC 3 which relays the task to the base station 2 to have the cellular telephone 1 respond to an audit or a page and would then request a location from the real-time location processor 5. The real-time location processor would in turn task the mobile location sensors 19 in the vicinity of the cellular telephone. This tasking is similar to the gather mode described above except that the bit pattern also includes the mobile identification number MIN of the cellular telephone. Although several cellular telephones may be accessing the base station using the RECC, only the transmission from the cellular telephone with the correct MIN will be collected and forwarded to the real-time location processor.

The CPU computes the complex cross correlation matrix (S matrix) between the various data vectors of the receiver/DSP channels. The eigenvalues and eigenvectors of the S matrix are then found. At very low SNR or when no signals are present, all the eigenvalues will be small and similar in amplitude. When one signal is present, the largest eigenvalue corresponds to the signal power, and the remaining eigenvalues will be similar in amplitude and correspond to the noise power of the RMCs and receivers. When N signals are present, there will be N large eigenvalues and the remaining eigenvalues are the noise power. This MUSIC algorithm can be used to determine the number of signals (and interferors) present and is discussed in the Ralph Schmidt reference.

The outputs from the various receivers are combined into a composite data vector in a process known as beamforming. Beamforming improves the signal to noise ratio since the signals from each antenna/RMC add coherently and the noise adds incoherently. Beamforming improves the signal to interference ratio by forming a composite antenna pattern in the direction of the signal and an antenna pattern null in the direction of the interference. For spatial beamforming, each data vector is multiplied by its complex beamforming coefficient and then the weighted data vectors are added together. The weight vector consists of the beamforming coefficients. Adaptive beamforming uses a set of beamforming coefficients for various subsets of the data vectors but must not destroy the TOA information. The output of the beamforming process provides an improved representation of the transmitted signal for subsequent time of arrival measurement. Temporal beamforming attempts to remove the multipath interference by using beamforming coefficients as the taps in a finite impulse filter operating on a single antenna/RMC output. Combinations of spatial and temporal beamforming remove interference that arrives at a different angles of arrival or time delays from the signal of interest.

There are several ways to derive a spatial beamforming weight vector: 1) If the MUSIC algorithm indicates that one signal is present, then the weight vector is the eigenvector corresponding to the largest eigenvalue. 2) An array manifold is a table indexed by angle of arrival and frequency that contains the amplitude and phase for each antenna/RMC. If an array manifold is available, then the MUSIC algorithm can also determine the angles of arrival for the signal of interest and the interferors. The weight vector is selected to have a large dot product with the array manifold for the angle of arrival of the signal of interest and to be orthogonal with the array manifold for the angle of arrival of the interferor. 3) The constant modulus algorithm (CMA) can be used to select the weight vector. The signal transmitted from the cellular telephone is frequency modulated and its envelope or modulus does not carry any information since it is constant. Multipath and co-channel interference may cause the amplitude of the received signal to vary with time. CMA selects the weight vector to minimize the am component of the received signal. The initial weights are selected to form a beam in the direction of the coarse geographical area. 4) If the data vector contains a known waveform, such as an order confirmation from the cellular telephone, the data vector is cross-correlated with a stored order confirmation waveform to determine when the order confirmation occurs.

More than one stored waveform may be necessary to accommodate for unknown carrier frequency and FM modulation index. The cross correlation, P, between the stored waveform and the data vectors is computed. The weight vector, H, which causes the minimum mean square error between the stored waveform and the composite data vector is $S^{-1}P$. 5) The composite data vector from the cell with the highest signal quality, hereafter called the reference vector, is distributed to the other MLSs. Signal quality is a function of signal to noise ratio and signal to interference ratio. Beamforming, using one of the previous techniques, may be employed at the local MLS prior to distribution to the adjacent MLSs. In the adjacent MLSs, the reference vector is cross correlated with the data vectors from each receiver to determine the time difference between the reference vector and the data vectors. The reference vector is time shifted so that it is time aligned with the data vectors. The cross correlation, P, between the time shifted reference vector and the data vectors is computed. The weight vector, H, which causes the minimum mean square error between the time shifted reference vector and the composite data vector, is $S^{-1}P$.

When a base station is located in a building, the antennas may be located on different faces of the building and antennas for one sector may be several hundred feet away from antennas of another sector. In such a case, beamforming would only use the two diversity antennas from a single sector rather than from multiple sectors so that multipath would not be introduced as a result of beamforming.

The composite vector is then encoded to form the coded vector so that each of its samples are represented with as few bits as possible but with enough bits so that the time-of-arrival information that it contains is not substantially degraded. One method is to represent the amplitude of the in-phase component with N bits and the quadrature component with N bits at each time interval. Another method is to represent the magnitude of the signal component with M bits and the phase with N bits at each time interval. Vector quantization, a third method, transmits a code word representing several samples of the composite vector and then forms an error signal between the composite vector and the one which is represented by the code word. This error signal is quantized and sent in addition to the code word for the set of samples to be encoded. Linear predictive coding, a fourth method, is based on using the previous samples to predict the current sample. Linear predictive coding forms an error signal as the difference between the composite vector and the output of a recursive filter operating on the encoded vector. The error signal is quantized to form the encoded vector. Lossless data compression techniques can also be used in conjunction with the aforementioned source coding techniques or by themselves to further reduce the required number of bits.

There are two methods of performing cross-correlation to determine the time difference of arrival: 1) Each MLS sends its coded vector to the RLP. The RLP decodes them, time shifts each composite vector so the A/D samples occur at the same time, selects the reference vector as the composite vector with the highest signal quality, cross-correlates the reference vector with the remaining composite vectors, and use interpolation to find the peak of the cross-correlation. 2) Each MLS sends its signal quality to the RLP. The RLP selects the MLS with the highest signal quality and tasks it to forward its coded vector to the RLP. The RLP relays the coded vector to the remaining MLSs as a reference vector. The remaining MLSs decodes the reference vectors, time shift the reference vector to align with its data vectors, select a weight vector, form a composite vector using beamforming, cross-correlate the time-shifted reference vector with the composite vector at various Doppler frequency shifts to simultaneously find the time difference of arrival and Doppler, and forward the signal quality, time difference of arrival, and Doppler to the RLP.

The time difference of arrival takes into account the various factors derived from calibration and reference vector shifting to minimize TDOA errors. The amplitude of the cross-correlation and the duration of the cross-correlation peak are also used to determine the signal quality. In the RLP, the signal quality factors and the various time difference of arrivals are combined to estimate the most likely position and velocity of the cellular telephone.

The RLP and MLSs operate in a pipelined fashion so that the tasking of the MLSs for signal #1, data collection for signal #2, transfer of the coded vector for signal #3, and cellular telephone location for signal #4 may occur at the same time. There may be occasions when two cellular telephones are to be located at the same time. If there is no overlap in which MLSs are used to locate each cellular telephone, then the pipeline cycles occur at the same time with a set of MLSs collecting data for one cellular telephone and a second set of MLSs collecting data for the other cellular telephone. If there is a slight overlap, then the MLSs with the overlap deploy some of their receivers for one cellular telephone and the remaining receivers for the other cellular telephone; beamforming may not be possible for this overlap condition in each MLS. If there is substantial overlap, the MLS are tasked to collect data on one cellular telephone at a given time and then tasked to collect data on the other cellular telephone at a different time.

The position of a cellular telephone is found by examining the differences in the times-of-arrival of simultaneous measurements and computing the intersection of the resulting hyperbolic lines of position. Signal quality is used to emphasize the various times of arrival so that those MLSs with higher signal quality are given more significance when computing the location.

Cross Correlation end Emitter Location

The complex reference waveform, $r(t)$ is cross-correlated against the composite complex waveform $z_i(t)$ from the with MLS:

$$R(\tau_i, \Omega_i, \omega_i) = \left| \int_{t_s}^{t_e} r(t) z_i^*(t+\tau_i) e^{j\left(\frac{1}{2}\Omega_i t^2 + \omega_i t\right)} \right|$$

where the TOA ($\tau_i$), chirp ($\Omega_i$), and Doppler frequency shift ($\omega_i$) are selected to maximize the cross-correlation function, $R(\tau_i, \Omega_i, \omega_i)$. The measurement cycle begins at time $t_s$ and ends at time $t_e$. When a mobile cellular telephone is in a vehicle on a freeway and is passing a mobile location sensor at the edge of the freeway, the rate of change of Doppler can be large enough that the phase shift is inadequately modeled by a linear function of time ($\omega_i t$) and must be modeled by a quadratic function of time:

$$\left(\frac{1}{2}\Omega_i t^2 + \omega_i t\right)$$

The time-of-arrival when the signal was received at the ith MLS relative to the reference waveform is:

$$t_i = \tau_i + \alpha_i$$

where $\alpha_i$ is determined during calibration of the MLS. The distance between the mobile cellular telephone at Cartesian coordinates (x,y) and an MLS at Cartesian coordinates ($x_i, y_i$) is equal to the distance that the emitter signal travels between time $t_i$ and $t_0$ at c, the electromagnetic wave propagation velocity.

$$\sqrt{(x-x_i)^2 + (y-y_i)^2} = c(t_i - t_0)$$

where $t_o$ is the time-of-arrival when the signal was transmitted from the cellular telephone relative to the reference waveform. When three MLS measure three times-of-arrival: $t_1$, $t_2$, and $t_3$, there are three equations $$\sqrt{(x-x_1)^2 + (y-y_1)^2} = c(t_1 - t_0)$$
$$\sqrt{(x-x_2)^2 + (y-y_2)^2} = c(t_2 - t_0)$$
$$\sqrt{(x-x_3)^2 + (y-y_3)^2} = c(t_3 - t_0)$$

to be solved for the three unknowns: x, y, and $t_0$ (the coordinates of the cellular telephone and the time when the signal left the cellular telephone). The Newton-Raphson method can be used to solve these nonlinear systems of equations (Press et al, Numerical Recipes, Cambridge University Press, 1986, pp 269–272.)

TDOA Calibration

There are several methods of accounting for and then removing systematic errors for TDOA processing. A calibration signal from the MLS is used to measure the time delay through the RMCs 23 and the receivers 25. Time shift filters undo the delay through the RMCs. Equalization filters compensate for the group delay variations through the receivers 25. Periodic application of the calibration signal permit the measurement of the group delay through these components that may vary with time and temperature. The GPS one pulse per second signal is used to determine the phase and frequency of the OCXO 30 in each MLS. Site surveys are used to measure the cable 21 lengths, the distance in latitude and longitude from each antenna to the GPS receive antenna, and the precise location of the GPS receive antenna.

There are two methods to remove residual errors,: 1) A test transmitter emits a cellular telephone signal which is received by several MLS. The transmission is coordinated so the RLP tasks the MLSs to process the test signal when the test signal is transmitting. The test transmitter may be fixed or mobile. The location of the test transmitter is determined by a GPS receiver co-located with the test transmitter and its location is sent to the RLP. The time delays are determined so that when added to the TDOA measurements yield a location as determined by the RLP identical to the test transmitter's location. 2) A cellular telephone can be located if it is intercepted by three MLS. If a cellular telephone is intercepted by more than three MLS, then its location is overdetermined, and the residual MLS error can be estimated. If four MLS can intercept five cellular telephones at different locations, then it is possible to simultaneously determine the location of the cellular telephones and the four residual time errors provided that the time of arrivals are accurately estimated, the cellular telephones are well separated, and good estimates of the residual errors and cellular telephone locations are provided. The estimate of residual time errors (biases) can be improved by considering tens of cellular telephones instead of just three.

AOA Processing

There may be places where a cellular telephone can only be intercepted by two mobile location sensors. Multipath propagation and co-channel interference may degrade the accuracy of TDOA measurements. For these reasons, the mobile location sensor is also capable of collecting AOA measurements before or after TDOA measurements. This AOA processing assumes that the antenna elements at the MLS site are close enough together to resolve AOA ambiguities over those azimuths corresponding to the coarse geographical area.

The mobile location sensor receives tasking from the real-time location processor to collect AOA measurements at a specific time and channel. The CPU 27 tunes the receivers 25 to the RVC of the cellular telephone. After the receivers have settled, the precision system clock 32 configures the RF switch 24 to route three of the antennas 20 to the three receivers. For base stations with six antennas, there are 120 combinations of six antennas taken three at a time. The precision system clock 32 sequences between all the antenna-receiver combinations. The DSPs 26 process the receiver outputs, collect the data vectors, and forward them to the CPU 25. The CPU computes the covariance matrix (S) between the various antennas based on the data vectors from the measurement cycles.

For each measurement cycle, the CPU computes the six complex conjugate dot products between the three data vectors taken two at a time. The CPU then averages those complex dot products that have the same RF path in terms of antennas and receivers. These complex averages are then converted into a magnitude and phase format. The phase of this complex average is related to the angle of arrival, the difference between the cable 21 lengths, and the phase difference between the receivers' 25 local oscillators. The phase difference between the receivers' local oscillators is canceled out by subtracting the phase of the forward baseline from the reverse baseline. For example, baseline phase $\beta 2\gamma 3$ is subtracted from baseline phase $\beta 3\gamma 2$ where $\beta 2\gamma 3$ is the phase of antenna $\beta$ receiver 2 compared with antenna $\gamma$ receiver 3, and $\beta 3 \gamma 2$ is the phase of antenna $\beta$ receiver 3 compared with antenna $\gamma$ receiver 2. A measurement cycle is also performed where the signal from one antenna is applied to two receivers through the RF switch and the coarse phase difference between the receiver's local oscillators is determined. The magnitude and phase difference is converted back into rectangular format and placed in the corresponding element of the S matrix. For a six antenna base station, the S matrix is a six by six conjugate symmetric covariance matrix. The diagonal elements of the S matrix contain the received signal power modified by the antenna gain which is a function of the angle of arrival and the direction the antenna is pointing.

The frequency response of the RMCs 23 may vary with temperature. To ensure that the S matrix is not affected by the RMC fluctuations, a dynamic calibration is periodically performed. At an unoccupied frequency channel near to the one used by the cellular telephone, the calibration signal 28 is applied to the RMCs 23 via the directional couplers 22. The receivers 25 are tuned to the calibration signal and a set of data vectors is collected. These data vectors are processed as described above to form the calibration S matrix. The uncompensated S matrix of the cellular telephone signal is adjusted by the calibration S matrix to remove the gain and phase variations between the various RMCs 23, thereby forming the compensated S matrix.

The frequency response of the receivers 25 may also vary with temperature. The calibration signal 28 is periodically routed through the RF switch 24 to the receivers 25. An equalization filter is computed in the DSPs 26 to compensate for the variations in gain and phase of each receiver's IF passband.

During static calibration, cellular telephone calls are placed from various locations by a test telephone 11. The location of this calibration cellular telephone 11 is determined by auxiliary means such as an inertial navigation system or GPS. The calibration cellular telephone 11 is moved about the cell to be calibrated so that a complete set of azimuths are obtained. The calibration cellular telephone antenna transmits either a horizontally polarized or vertically polarized signal and calibration data is collected for both conditions. The azimuth of the calibration cellular telephone 11 with respect to the base station, frequency channel, and S matrix are recorded as coarse static calibration data. This data is processed to yield the static calibration table by discarding outliners, averaging, and interpolation. The static calibration table contains the signal arrival vector $a(\theta,f)$ where each element of the vector corresponds to a different antenna and contains the amplitude and relative phase for both horizontal and vertical polarizations for that antenna at a specific azimuth ($\theta$), and frequency (f) of the calibration cellular telephone 11. Since the test telephone may not be at a specific azimuth covered by the discrete entries of static calibration table, interpolation is necessary to adjust the signal arrival vector for the specific azimuths used in the table. Since the static calibration table contains correlated information and it is advantageous to have the table occupy a modest amount of memory, only a small set of azimuths and frequencies are used. For example, the static calibration table could have 4 frequencies, and 360 azimuths. The static calibration table is stored in non-volatile memory such as the disk 36.

Another technique of forming the static calibration table is to temporarily deploy several additional MLSs at sites other than the permanent MLSs in the cellular base stations. The temporary and permanent MLSs use TDOA techniques to locate the cellular telephones in the service area. These cellular telephones are not special test transmitters but owned and operated by the wireless subscribers. The TDOA measurements are used to determine the location of cellular telephones and consequently their azimuth relative to the permanent MLSs in the cellular base stations. The permanent MLSs use the base station's antenna and also collect S matrices. The S matrices along with the azimuths are used to form a static calibration table. The temporary MLSs can then be removed. A large number of intercepts from cellular telephones would be required to ensure that there were intercepts from all angles-of-arrival. A possible limitation of using TDOA to generate the static calibration table is that TDOA measurement errors are subsequently manifest as static calibration table errors which would produce systematic AOA errors.

Frequency and azimuth are the indices or addresses to the static calibration table. The signal arrival vector is the contents of the static calibration table. Interpolation is used to retrieve a signal arrival vector if the frequency or azimuth is slightly different than the discrete indices used to access the table.

The eigenvalues and eigenvectors of the compensated S matrix are determined. The eigenvalues identify the number and power of co-channel signals and the receiver noise power. If co-channel signals are present, a separate AOA is derived for each. Those AOA which don't intersect near the coarse geographical area are dismissed since all but one would be from co-channel signals.

After the static calibration table has been formulated, it is used to estimate the azimuth of a cellular telephone. A hypothetical azimuth for the cellular telephone is assumed, the signal arrival vector is retrieved from the static calibration table for the frequency of the cellular telephone at the assumed azimuth, and it is compared with the compensated S matrix of the cellular telephone to be located. The hypothetical azimuth are adjusted until there is a match between the signal arrival vector and the compensated S matrix. The MUSIC algorithm can be used to perform this comparison. This is similar to finding the azimuth that minimizes the mean square error between the signal arrival vector and the compensated S matrix. The comparison must be insensitive to the unknown cellular telephone transmit power. There may be several azimuths that produce a local minima and each of these along with their mean square error and second derivative of the mean square error constitute the AOA measurements. The second derivative of the mean square error is a measure of how much the azimuth may change before the mean square error changes significantly. The mean square error for all azimuths may be so high, that the CPU decides that the signal arrival vector does not match the compensated S matrix; no AOA measurements would be produced.

AOA measurements are forwarded to the real-time location processor where they are combined with other AOA measurements and/or TDOA measurements to estimate the location of the cellular telephone. The emitter location takes into account the quality factors (mean square error and its second derivative) to emphasize the angles of arrival in the event that more than two total AOA measurements are derived by the various mobile location sensors.

If the RLP reports to search and queue process that the quality of the AOA measurements were low due to multipath, co-channel interference, or low received signal level, the search and queue process sends a mobile station control message to the MSC to change the frequency and/or increase the power. AOA measurements are then taken by the MLSs with the hope that the co-channel and multipath conditions will be different and permit more accurate measurements. The RLP uses the AOA measurements from both frequencies and/or powers to calculate the cellular telephone's location.

COARSE AOA

The AOA can be estimated in a coarse sense by using the received signal strength as measured by each antenna. This coarse AOA technique is applicable for antenna configurations of three or more sectors, each sector having a directional antenna. The directivity of the antenna permits the AOA to be determined since the antenna gain varies with azimuth. This technique does not require an array manifold or static calibration table.

A noise amplitude matrix N is formed with each diagonal element being an estimate of the noise amplitude of the corresponding RMC/antenna at the frequency channel being measured, and the off diagonal elements being zero. The noise amplitude is measured when no transmissions from cellular telephones are present.

The S matrix is computed as previously described. The total integration time should be long enough to mostly overcome the effects of Raleigh fading so that a good estimate of the received signal strength is obtained. The noise compensated S matrix, $C=N^{-1}SN^{-1}$, should have all of its eigenvalues approximately equal to 1 when no signal is present. When one signal is present, the largest eigenvalue of C is signal-plus-noise-to-noise ratio. The ratio of the largest eigenvalue to the second largest eigenvalue is a measure of the signal-to-interference ratio and is used as a measure of the quality or the confidence of the accuracy of the coarse AOA. This assumes that the signal of interest is stronger than the interference.

To make this technique insensitive to the signal-to-noise ratio, the noise power matrix is subtracted from the covariance matrix to form the signal matrix, $X=S-NN^T$. The diagonal elements of X are estimates of the received signal power for each RMC/antenna. The diagonal elements of X are then adjusted to compensate for the RMC gain, boresite antenna gain, and cable loss; averaged for chose diversity antennas that point in the same sector; and converted to a logarithmic dB scale. This averaging further reduces the effects of Raleigh fading. Let $P_C$ be this result, the measured power in dBm of the sector with the largest power. Likewise, let $P_L$ and $P_R$ be the power of the sector to the left (lower in azimuth) and to the right (higher in azimuth) of the antenna with the largest power. Let the azimuths of the boresite directions of these antennas be $A_c$, $A_L$, and $A_R$. The AOA measured to the nearest sector is $A_C$, the direction of the antenna with the largest power. A better AOA can be obtained by first assuming that the antenna gain as a function of azimuth is parabolic:

$$P_L = -\frac{12}{\omega^2}(\theta - a_L)^2 + x$$

$$P_C = -\frac{12}{\omega^2}(\theta - a_C)^2 + x$$

$$P_R = -\frac{12}{\omega^2}(\theta - a_R)^2 + x$$

where θ is the coarse AOA, ω is the antenna beamwidth, and x is related to the transmitted power. Eliminating the transmitted power from these equations yields the coarse AOA:

if $P_L > P_R$ $$d = P_C - P_L$$

$$\theta = d\left[\frac{\omega^2}{24(A_C - A_L)}\right] + \frac{A_C + A_L}{2}$$

else $$d = P_C - P_R$$

$$\theta = d\left[\frac{\omega^2}{24(A_C - A_R)}\right] + \frac{A_C + A_R}{2}$$

Note that the parabolic model of the antenna gain yields an azimuth that varies linearly with the difference, d, of the power of the sector with the largest power and the power of the sector with the second largest power. Other functions are readily apparent to those skilled in the art to model the azimuth, θ, as a function of the difference, d.

Calibration can also be used to improve the accuracy of this coarse AOA technique. A calibration cellular telephone 11 is moved about the cell with the antenna to be calibrated and calls are placed. The location of the calibration telephone is determined with a GPS receiver and the actual azimuth is computed. The signal powers $P_c$, $P_L$, and $P_R$ are measured for each call. After collecting a set of calibration data, the modeling parameters (ω, $A_c$, $A_L$, and $A_R$) are selected to minimize the mean square error between the actual azimuth and the coarse AOA.

The coarse AOA from two or more MLS can be used to compute a coarse geographical area. This coarse area can then be used to resolve ambiguities, reduce the search time of a calibration table, discard erratic measurements, select signals for beamforming, to select MLSs for fine AOA or TDOA measurements, initialize CMA weights, or to discard erratic locations.

While the invention has been particularly shown and described with reference to preferred embodiments thereof, it will be understood by those skilled in the art that the foregoing and other changes in form and details may be made therein without departing from the spirit and scope of the invention.

We claim:

1. A location system for identifying locations of emitters in a service area where the service area is divided into coarse areas, the location system comprising:

searching means for identifying only active emitters transmitting emitter signals at a present time in the service area, finding means for determining the coarse areas in which selected ones of the active emitters are located at the present time, each selected active emitter in a corresponding one of said coarse areas, selecting means using selection criteria for designating one or more of the active emitters as selected emitters, the selection criteria including a search list for designating particular ones of the active emitters in a service area for locating, the searching means operable to forward the identities of each active emitter to the selecting means for comparison against entries stored in the search list, a plurality of sensors, each sensor at a different location and each sensor including measurement means for taking measurements on emitter signals, tasking means for tasking groups of said sensors, one group of tasked sensors for each corresponding selected emitter, where tasked sensors for a particular group are chosen from said plurality of sensors, each tasked sensor of the particular group taking a measurement on an emitter signal transmitted by the corresponding selected emitter, and processing means for determining the location of each selected emitter based on the measurements from the group of tasked sensors for the corresponding selected emitter.

2. A location system for identifying locations of emitters in a service area where the service area is divided into coarse areas, the location system comprising:

searching means for identifying only active emitters transmitting emitter signals at a present time in the service area, selecting means using selection criteria for designating one or more of the active emitters as selected emitters, the selection criteria including a selection list identifying particular ones of the emitters in a service area for locating, finding means for determining the coarse areas in which each of said selected emitters are located at the present time, each selected emitter in a corresponding one of said coarse areas, a plurality of sensors, each sensor at a different location and each sensor including measurement means for taking measurements on emitter signals, tasking means for tasking groups of said sensors, one group of tasked sensors for each corresponding selected emitter, where tasked sensors for a particular group are chosen from said plurality of sensors, each tasked sensor of the particular group taking a measurement on an emitter signal transmitted by the corresponding selected emitter, and processing means for determining the location of each selected emitter based on the measurements from the group of tasked sensors for the corresponding selected emitter.

3. A location system for identifying locations of emitters in a service area where the service area is divided into coarse areas, the location system comprising:

selecting means using selection criteria for designating one or more active emitters transmitting emitter signals at a present time as selected emitters, the selection criteria including a selection list identifying particular ones of the emitters in a service area for locating, finding means for determining the coarse areas in which the selected emitters are located, each selected emitter in a corresponding one of said coarse areas, a plurality of sensors, each sensor at a different location and each sensor including measurement means for taking measurements on the emitter signals, tasking means for tasking groups of said sensors, one group of tasked sensors for each corresponding selected emitter, where tasked sensors for a particular group are chosen from said plurality of sensors, each tasked sensor of the particular group taking a measurement on an emitter signal transmitted by the corresponding selected emitter, and processing means for determining the location of each selected emitter based on the measurements from the group of tasked sensors for the corresponding selected emitter.

4. The location system of claims 1, 2 or 3 wherein said tasking means chooses said sensors based upon the capability of the tasked sensors to intercept emitter signals from a coarse area in which the corresponding selected emitter is located.

5. The location system of claims 1, 2 or 3 wherein said tasking means chooses said sensors based upon the priority of selected emitters.

6. The location system of claims 1, 2 or 3 wherein said tasking means chooses said sensors based upon the availability of said sensors for tasking.

7. The location system of claims 1, 2 or 3 wherein said emitters are cellular telephones and the emitter signals are transmitted on reverse voice or reverse control channels.

8. The location system of claims 1, 2 or 3 wherein said selection criteria includes priority criteria for identifying higher priority emitters and lower priority emitters and wherein said tasking means uses said priority criteria to cause the higher priority emitters to be located before the lower priority emitters.

9. The location system of claims 1, 2 or 3 wherein said tasking means includes queuing means for identifying time intervals when sensors are available for tasking.

10. The location system of claims 1, 2 or 3 wherein said location system includes means for adding unlocated emitters to a queue of selected emitters to be located and includes means for deleting emitters from the queue.

11. The location system of claim 10 wherein said means for deleting includes means for purging unlocated emitters from the queue based upon time durations that said unlocated emitters have been in the queue.

12. The location system of claim 11 wherein said means for deleting includes means for purging unlocated emitters from the queue based upon priorities of unlocated emitters in the queue.

13. The location system of claims 1, 2 or 3 including a real time network between said sensors and said processing means for communicating the measurements to said processing means.

14. The location system of claims 1, 2 or 3 wherein a quality factor is formed for each measurement and said processing means uses the quality factor in determining the locations of selected emitters.

15. The location system of claims 1, 2 or 3 wherein said plurality of sensors include two or more sensors and wherein said measurements include angle-of-arrival information determined from angles that the emitter signals arrive at said two or more sensors.

16. The location system of claims 1, 2 or 3 wherein said tasking means causes said sensors to take two or more sets of measurements at different time intervals and said processing means uses said sets of measurements to determine the selected emitter location.

17. The location system of claims 1, 2 or 3 wherein said tasking means causes said sensors to take measurements over variable times and includes means for controlling durations of said variable times.

18. The location system of claims 1, 2 or 3 wherein said plurality of sensors include two or more sensors and wherein said measurements include angle-of-arrival information determined from angles that the emitter signals arrive at said two or more sensors and includes time-of-arrival information determined by times when the emitter signals arrive at said two or more sensors.

19. The location system of claims 1, 2 or 3 wherein said plurality of sensors include three or more sensors and wherein said measurements include time-difference-of-arrival information determined by the differing times when the emitter signals arrive at said three or more sensors.

20. The location system of claims 18 or 19 wherein each of said sensors includes insertion means for inserting a calibration signal at one or more frequencies into said sensor means for measuring the delay through the sensor means at one or more frequencies.

21. The location system of claims 18 or 19 wherein said processing means finds the biases in time-of-arrival information from one or more first selected emitters at known locations and corrects the time-of-arrival information of one or more second selected emitters based upon said biases.

22. The location system of claims 18 or 19 wherein said processing means includes means for determining the velocity of each selected emitter.

23. The location system of claims 18 or 19 wherein each of said sensors has two or more antennas for sensing the emitter signals and each of said sensors has receiver means for receiving the emitter signals from the two or more antennas to form receiver output signals and has combining means for combining the receiver output signals to form a composite signal where the measurement is taken on the composite signal.

24. The location system of claim 23 wherein said combining means reduces co-channel interference, mitigates multi-path delay effects or improves signal-to-noise ratios.

25. The location system of claim 23 wherein said processing means includes cross-correlating means for cross-correlating the composite signal from one sensor with one or more signals from one or more other sensors to determine, for each selected emitter, the time-of-arrival information.

26. The location system of claim 23 wherein said emitters are cellular telephones and the emitter signals are transmitted on reverse voice or reverse control channels.

27. The location system of claims 1, 2 or 3 wherein said plurality of sensors include four or more sensors and wherein said measurements include time-of-arrival information determined by times when emitter signals from five or more selected emitters arrive at said four or more sensors and wherein said processing means simultaneously determines the location of the selected emitters and biases in time-of-arrival information of each of said four or more sensors.

28. The location system of claims 1, 2 or 3 further including probing means for transmitting a probe signal to a particular selected emitter to cause said particular selected emitter to transmit an emitter signal.

29. The location system of claim 28 wherein said probe signal is a cellular telephone forward control channel or forward voice channel signal.

30. The location system of claim 28 wherein said probe signal causes said particular selected emitter to transmit emitter signals on two or more frequencies and wherein said measurement means takes said measurements for said two or more frequencies.

31. The location system of claim 28 wherein said probe signal causes said particular emitter to transmit emitter signals at two or more power levels and wherein said measurement means takes said measurements for said two or more power levels.

32. The location system of claim 28 wherein said particular emitter has a deterministic emitter delay time from when said probe signal is received by said particular emitter and when said particular emitter responsively transmits the emitter signal and wherein said processing means determines the transmission time between said particular emitter and a particular one of said sensors as a time from when the probe signal is sent to a time when the emitter signal is received by said particular one of said sensors minus said emitter delay time whereby the range between said emitter and said particular one of said sensors is determined from said transmission time.

33. The system of claims 1, 2 or 3 wherein said selection criteria is stored and is editable by authorized location applications.

34. A location method for identifying locations of emitters in a service area, the location method comprising:

searching to identify active emitters in the service area, each active emitter transmitting emitter signals at a present time in the service area, finding to determine a coarse area for each active emitter within the service area at the present time, each active emitter in a corresponding one of said coarse areas, selecting using selection criteria to designate one or more of the active emitters as selected emitters, the selection criteria including a selection list identifying particular ones of the emitters for locating, measuring emitter signals with a plurality of sensors, each sensor at a different location, tasking groups of said sensors, one group of tasked sensors for each corresponding selected emitter, where tasked sensors for a particular group are chosen from said plurality of sensors, each tasked sensor of the particular group taking a measurement on an emitter signal transmitted by the corresponding selected emitter, and processing to determine the location of each selected emitter based on the measurements from the group of tasked sensors for the corresponding selected emitter.

35. A location method for identifying locations of emitters in a service area where the service area is divided into coarse areas, the location method comprising:

receiving an emitter signal from an emitter transmitting in the service area at a present time, selecting using selection criteria to designate one or more of the transmitting emitters as selected emitters, the selection criteria including a selection list identifying particular ones of the emitters for locating, finding to determine the coarse areas in which each of said selected emitters are located at a present time, each selected emitter in a corresponding one of said coarse areas, measuring emitter signals with a plurality of sensors, each sensor at a different location, tasking groups of said sensors, one group of tasked sensors for each corresponding selected emitter, where tasked sensors for a particular group are chosen from said plurality of sensors, each tasked sensor of the particular group taking a measurement on an emitter signal transmitted by the corresponding selected emitter, and processing to determine the location of each selected emitter based on the measurements from the group of tasked sensors for the corresponding selected emitter.

36. A location method for identifying locations of emitters in a service area where the service area is divided into coarse areas, the location method comprising:

selecting using selection criteria to designate one or more active emitters transmitting emitter signals as selected emitters, the selection criteria including a selection list identifying particular ones of the emitters for locating, finding to determine the coarse areas in which the selected emitters are located, each selected emitter in a corresponding one of said coarse areas, measuring emitter signals with a plurality of sensors, each sensor at a different location, tasking groups of said sensors, one group of tasked sensors for each corresponding selected emitter, where tasked sensors for a particular group are chosen from said plurality of sensors, each tasked sensor of the particular group taking a measurement on an emitter signal transmitted by the corresponding selected emitter, and processing to determine the location of each selected emitter based on the measurements from the group of tasked sensors for the corresponding selected emitter.

* * * * *